US006898202B2

(12) United States Patent
Gallagher et al.

(10) Patent No.: US 6,898,202 B2
(45) Date of Patent: May 24, 2005

(54) METHOD, APPARATUS AND COMPUTER PROGRAM FOR INFORMING A REQUESTING DEVICE OF PORT CONFIGURATION CHANGES IN A COMPUTER NETWORK SWITCHING DEVICE

(75) Inventors: Robert J. Gallagher, Hurley, NY (US); William J. Rooney, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 870 days.

(21) Appl. No.: 09/892,972

(22) Filed: Jun. 27, 2001

(65) Prior Publication Data

US 2003/0002492 A1 Jan. 2, 2003

(51) Int. Cl.[7] .................................................. H04L 12/56
(52) U.S. Cl. ........................ 370/401; 370/422; 710/316
(58) Field of Search ................................ 370/422, 425, 370/428, 401

(56) References Cited

U.S. PATENT DOCUMENTS

| | | | | |
|---|---|---|---|---|
| 5,297,262 | A | 3/1994 | Cox et al. | 395/325 |
| 5,890,008 | A | 3/1999 | Panwar et al. | 395/800.15 |
| 6,094,686 | A | 7/2000 | Sharma | 709/240 |
| 6,167,521 | A | 12/2000 | Smith et al. | 713/200 |
| 6,233,242 | B1 * | 5/2001 | Mayer et al. | 370/412 |
| 6,260,073 | B1 * | 7/2001 | Walker et al. | 709/249 |
| 6,324,613 | B1 * | 11/2001 | Aguilar et al. | 710/316 |

FOREIGN PATENT DOCUMENTS

| | | | | |
|---|---|---|---|---|
| JP | 9282301 A | 10/1997 | ........... | G06F/15/78 |

OTHER PUBLICATIONS

IBM Technical Disclosure Bulletin, vol. 38, No. 4, Apr. 1995, pp. 173–181, entitled "Coupling Facility Serviceability–Event Notification of Link–Incident Records and Error Reporting".

Introduction to IBM S/390 FICON by K. Trowell et al, Oct. 1999, Manual No. SG24–5176–00.

IBM ESCON Director 9032–5 Presentation by Trowell et al, Sep. 1999, Manual No. SG24–2005–00.

S/390 Planning For the 9032 Model 5 Director with FICON Converter Feature, Aug. 1999, Manual No. SA22–7415–01.

Programming the Interface for Enterprise Systems Connection Directors with FICON Converter Feature, 9/ 999, Manual No. SA23–0356–06.

eServer zSeries 900 System Overview, Oct. 2000, Manual No. SA22–1027–00.

(Continued)

*Primary Examiner*—Chau Nguyen
*Assistant Examiner*—Puneet Bhandari
(74) *Attorney, Agent, or Firm*—Lily Neff; Andrew J. Wojnicki, Jr.

(57) ABSTRACT

A method, apparatus, and computer program device enabling a computer network switching device to inform an attached requesting device of switch ports affected by configuration changes during the period of time since the last query by the particular requesting device. The switch device is initialized with a change index and data vector, the latter indicative of an initial port configuration. The switch increments the index in response to subsequent port configuration change events, and stores in association with the incremented index a data vector indicating the ports changed during the corresponding event. The switch stores an array of associated index and vector values. The switch responds to a query from an attached requesting device by informing the requesting device of specific ports affected by one or more configuration changes since the index value held by the requesting device was the current index value in the switch.

34 Claims, 18 Drawing Sheets

OTHER PUBLICATIONS z/OS Introduction and Release guide, Release 1, Mar. 2001, Manual No. GA22–7502–00.

Enterprise Systems Architecture/390, Common I/O Device Commands and Self Description—Aug. 1995, Manual No. SA22–7204–02 and Technical Newsletter update TNL SN22–5535.

Fiber Channel Connection (FICON) I/O Interface—Physical Layer, Oct. 2000, Manual No. SA24–7172–02.

Introduction to Storage Area Network, SAN, by R. Khattar et al, Aug. 2000, Manual No. SG24–5470–00.

z/Architecture—Principles of Operation, Dec. 2000, Manual No. SA22–7832–00.

* cited by examiner

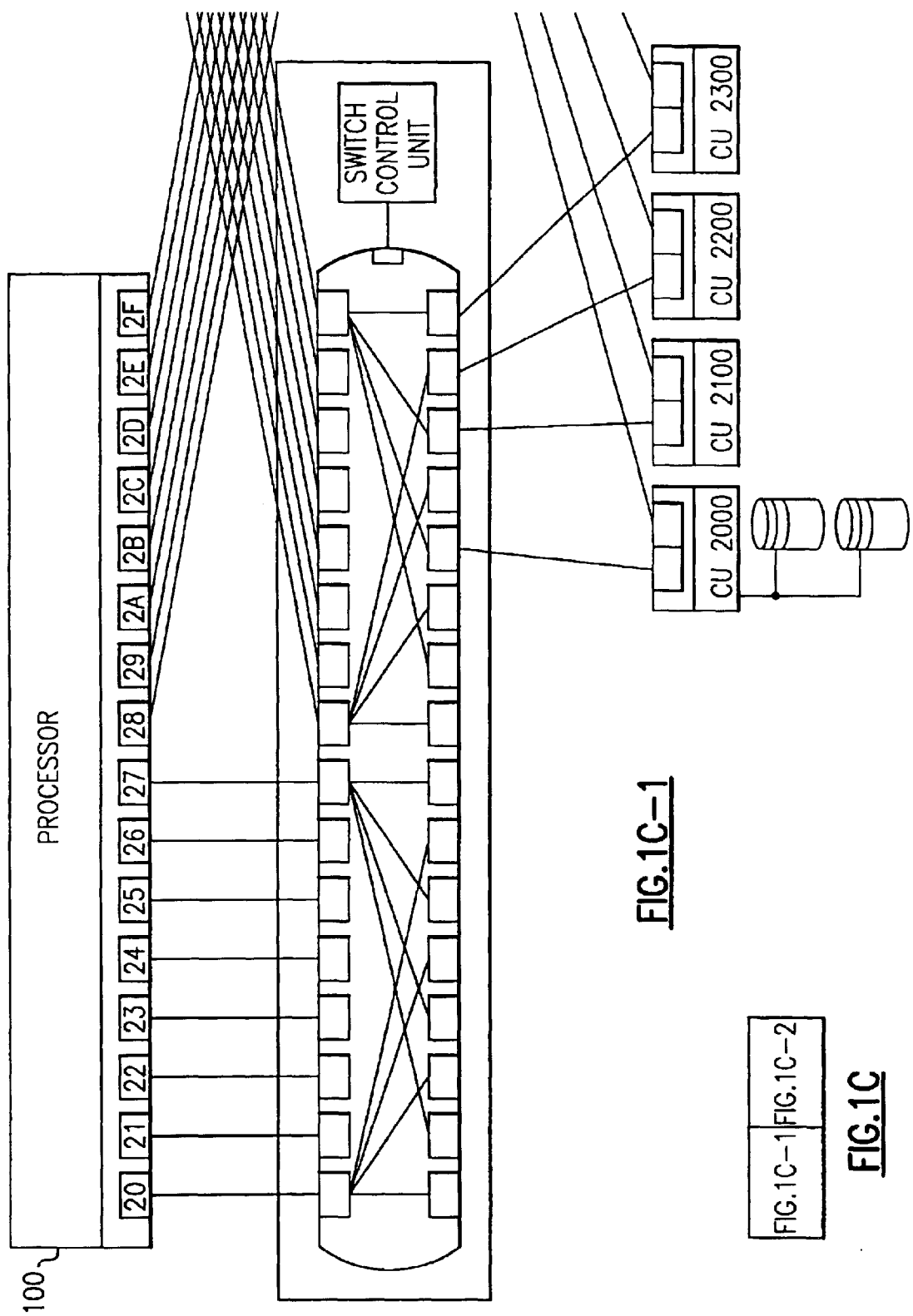

METHOD, APPARATUS AND COMPUTER PROGRAM FOR INFORMING A REQUESTING DEVICE OF PORT CONFIGURATION CHANGES IN A COMPUTER NETWORK SWITCHING DEVICE

FIELD OF THE INVENTION

The present invention relates in general to computer and communication network switch devices, and more particularly, to a method, computer program device, and apparatus for informing a requesting device of specific switch ports affected by one or more changes to the switch port configuration.

BACKGROUND OF THE INVENTION

A recent trend in computing system architecture is the Storage Area Network (SAN). SANs are described in an IBM® publication titled "Introduction to Storage Area Network, SAN," IBM Publication No. SG24-5470-00, August 1999, which is hereby incorporated herein by reference in its entirety. As noted in this publication, a SAN "is a high-speed network, comparable to a LAN, that allows the establishment of direct connections between storage devices and processors . . . " Two aspects of this definition deserve further discussion. First, a SAN is a network used in addition to a standard communication network, such as a local area network (LAN). Storage input/output (I/O) operations are conducted over the SAN, reducing data transfer traffic on the LAN. Second, the SAN allows direct connections between processors and storage devices, thereby eliminating the need for storage devices dedicated to specific processors. In addition, since these direct connections may alternatively be accomplished by an I/O subsystem (such as a channel subsystem, as known in S/390® architecture), the central processors are further relieved of the burdens associated with data transfer.

A SAN requires a network infrastructure to implement the direct processor to storage connections discussed above. One type of device capable of providing such a SAN infrastructure is known as a switch. A switch is a device capable of providing on demand, anything-to-anything connections between attached devices. A switch typically provides a number of ports to which external devices may attach. The switch provides the ability to dynamically connect any port to any other port, thereby enabling any attached device to communicate with any other attached device. Switches may be used to accomplish direct connections between devices, or switches may be combined in cascaded or chained topologies in order to increase the total number of ports within the network, or to increase the allowable physical distance between connected devices.

In SAN switches known in the art, a configuration is associated with each port at any point in time. The configuration of a particular port is comprised of information describing the specific device attached to the port, as well as one or more connectivity attributes assigned to the port. Connectivity attributes determine the extent to which a particular port is available to form dynamic connections with other ports. For example, a port may be available to dynamically connect with any other port. Or, a particular port may be unavailable to make a dynamic connection with another port, for a variety of reasons: the port may have a dedicated (static) connection to another port, or the port may be unavailable to connect with a particular port or ports, or the port may be unavailable to connect with any other port.

The configuration of a switch port can be changed in a number of ways. The switch may include a processor or other controller, which may be attached to an operator console. An operator may be able to change the port configuration via this attached operator console. Also, it may be possible for one or more processors attached to one or more switch ports to change the port configuration. Since multiple processors, concurrently running multiple applications, can be attached to a particular switch, multiple host applications capable of modifying the port configuration of a single switch can be operating concurrently. Further, the port configuration could be modified via changes to the physical device connected to a port, or changes in the connection between the port and the physical device (such as a link failure or cable disconnect). Finally, in an environment using cascaded or chained switches, port configuration changes in one switch could be initiated by another connected switch. As should be apparent to one of ordinary skill in the art, in an environment where so many factors can result in port configuration changes on any particular switch, there exists a need for the switch to inform connected devices of the current port configuration. As used herein, the term "requesting device" refers to any device which is capable of inquiring as to the port configuration of a switch connected to the requesting device.

In switch systems known in the art, a switch provides a connected requesting device with the current switch port configuration by exchanging two sets of information: port configuration details, and a time stamp or index value. The requesting device stores the index value in association with the port configuration details for future reference. The switch tracks subsequent port configuration changes, such as by incrementing an index value or otherwise storing information indicative of the most recent configuration change. When a requesting device attempts to initiate a port configuration change or take other actions dependent upon port configuration, the requesting device first queries the switch to determine whether or not the requesting device has stored the switch's current configuration. To accomplish this, the requesting device provides to the switch the time stamp or index value associated with the most recent port configuration details known to or stored in the requesting device. If this value (time stamp or index) matches the current value stored in the switch, the requesting device has the most recent port configuration information, and is therefore able to institute a port configuration change or take other actions dependent upon port configuration. If, however, the values do not match, then at least one port configuration change has taken place since the requesting device last updated its port configuration data. The requesting device should now establish the current port configuration before attempting to modify the current port configuration, or prior to taking any other action dependent upon port configuration.

In switch systems known in the art, the switch merely informs the requesting device as to whether or not the requesting device has the current port configuration information. Such a scheme, implemented by exchanging a value referred to as a "key," is described in U.S. Pat. No. 5,297,262, titled "Methods and Apparatus for Dynamically Managing Input/Output (I/O) Connectivity," issued Mar. 22, 1994, which is assigned to the same assignee as the present application, and which is hereby incorporated herein by reference in its entirety. If the requesting device does not have the current port configuration, the requesting device completely refreshes its port configuration information for all ports within the switch, since the requesting device has no information indicating which port attributes have changed. The requesting device processor is therefore involved in completely refreshing its port configuration data, even if the configuration attributes of only one port are modified. Causing the requesting processor (or processors) to refresh port configuration information that is both current and valid tends to be wasteful of valuable processor resources. In particular, in circumstances where frequent changes are made to the attributes of individual ports in a switch containing many ports, causing several connected processors to refresh configuration information for unmodified ports becomes time consuming and very inefficient. In addition to the inefficient use of host processor resources, switch processor resources are also used inefficiently in such a system, since the switch processor is involved in the data refresh process for each attached requesting device. Where many attached devices request frequent port configuration updates, switch processor resources may become a system bottleneck.

For the foregoing reasons, therefore, there is a need in the art for a method, device, and computer program product enabling a switch to provide to a requesting device sufficient information for the requesting device to determine the specific ports for which the requesting device should update its local port configuration data.

SUMMARY

The present invention is directed to a method, apparatus, and computer program device enabling a switch to provide to a requesting device sufficient information for the requesting device to determine the specific ports for which the requesting device should update its local port configuration data. In particular, the present invention improves processing efficiency by informing a requesting device of specific ports which have been affected by configuration changes since the last update available to the requesting device. In this manner, the requesting device is able to refresh its detailed port configuration information for the specific ports changed, eliminating the need to refresh configuration information that is already known to the requesting device.

In preferred embodiments of the present invention, the switch increments a time stamp indicator, such as an index or key value, each time one or more modifications are made to the switch port configuration attributes. A configuration change event (or simply a change event) is defined as a specific instance whereby the configuration attributes of one or more switch ports are modified. The index value provides a representation of the change events: each change event is represented by a single index value. Each index value, therefore, represents a particular change event, during which the configuration of one or more ports is modified. When each change event occurs, the switch builds a data structure, such as a change data vector, indicating the specific switch ports affected by the configuration change event. The change data vector (also referred to herein as "data vector") is stored in association with the key or index value corresponding to the specific configuration change event, such as in a table or array. Each associated pair of index value and data vector forms a table record, representing a specific change event and the one or more ports affected by the specific change event. The key or index value provides an index to the table: the switch is capable of searching the table to locate a particular index value. Index values may be recycled over time, however at any point in time all index values stored within the table are unique, and each such stored index value corresponds to a single specific change event. Corresponding to a specific key or index value stored in the table, and therefore corresponding to the specific configuration change event represented by the specific key or index value, the associated data vector provides an indication of the ports altered by the specific change event represented by the index value. When a requesting device queries the switch, the current index value stored in the switch is compared to the most recent index value known to the requesting device. If the values do not match, the switch may be able to inform the requesting device of the specific ports that have been modified, by utilizing the stored table of associated index values and change data vectors.

In preferred embodiments of the present invention, the change data vector comprises a series of bits, where each bit represents a switch port. Each data vector is stored in a table, along with an index value. Each pair of values (index and data vector) forms a table record, where each table record corresponds to a particular port configuration change event. Within a particular data vector, the value of each bit indicates whether the port represented by that bit was affected by the configuration change event represented by the particular data vector. By creating and storing a series of such table records (index and data vector), one record for each change event, the switch builds a table summarizing the history of configuration change events and the specific ports affected thereby. This history summary table provides the basic information which the switch uses to inform a requesting device of the ports affected by one or more configuration change events.

In preferred embodiments of the present invention, when the switch determines that the most recent index known to the requesting device is different than the current index value stored in the switch (thereby indicating that one or more ports have changed), the switch builds and returns to the requesting device a history summary vector. The history summary vector is similar in structure to the change data vector: each comprises a series of bits, where each bit represents a switch port. The summary vector differs from the change data vectors in one important aspect: the summary vector represents ports affected by a series of change events, where each data vector represents ports affected by one specific change event. In this regard, the history summary vector represents a summary of the ports whose configurations changed during the time since the requesting device last updated its port configuration information.

In preferred embodiments of the present invention, when the requesting device queries the switch, the requesting device passes to the switch the most recent index value known to the requesting device. Also in preferred embodiments, the switch stores this index value for use in subsequent processing. In particular, if the index value that the requesting device passes to the switch is not equal to the current index value stored in the switch, the switch begins building the summary vector using the stored index value from the requesting device, incremented by one.

In practical implementations of the present invention, the history summary table is capable of storing a finite number of records, representing a finite number of configuration change events. In preferred embodiments of the present invention, the history summary table retains the records corresponding to the most recent change events, discarding the records corresponding to the least recent change events as needed to store more recent records. Under these circumstances, there is a possibility that the most recent index value known to a requesting device is no longer stored within the history summary table. In preferred embodiments of the present invention, the switch handles this situation by informing the requesting device that the configuration of all implemented ports may have changed. As used herein, the set of implemented ports for any specific model or type of switch is the complete set of ports supportable by the particular model of switch, regardless of whether or not all of the supportable (implemented) ports are in use or even physically installed.

In preferred embodiments of the present invention, the switch is an ESCON® director, and the requesting device is a host processor. In alternative embodiments, the switch may be a FICON™ director, or any other switch in a switched I/O network, such as a SAN environment. Also, in alternative embodiments a cascaded or chained switch topology is employed, wherein the requesting device may be a switch.

It is therefore an object of the present invention to enable an improvement in the efficiency with which a device updates its port configuration tables corresponding to an attached switch.

It is a further object of the present invention to provide, within a switch, a data structure indicating the specific port or ports affected by a single port configuration change event. It is a further object of the present invention to provide, within the same switch, a series of such data structures representing a series of the most recent port configuration change events.

It is a further object of the present invention to provide a series of communication protocols through which a requesting device can query a switch as to the current port configuration, and further through which the switch can inform the requesting device of all ports for which the requesting device should update its stored port configuration data.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

In accordance with preferred embodiments of the present invention, a network switch informs an attached requesting device of the specific switch ports affected by one or more configuration changes occurring since the most recent port configuration known to the requesting device.

Environment

Figure 1A:
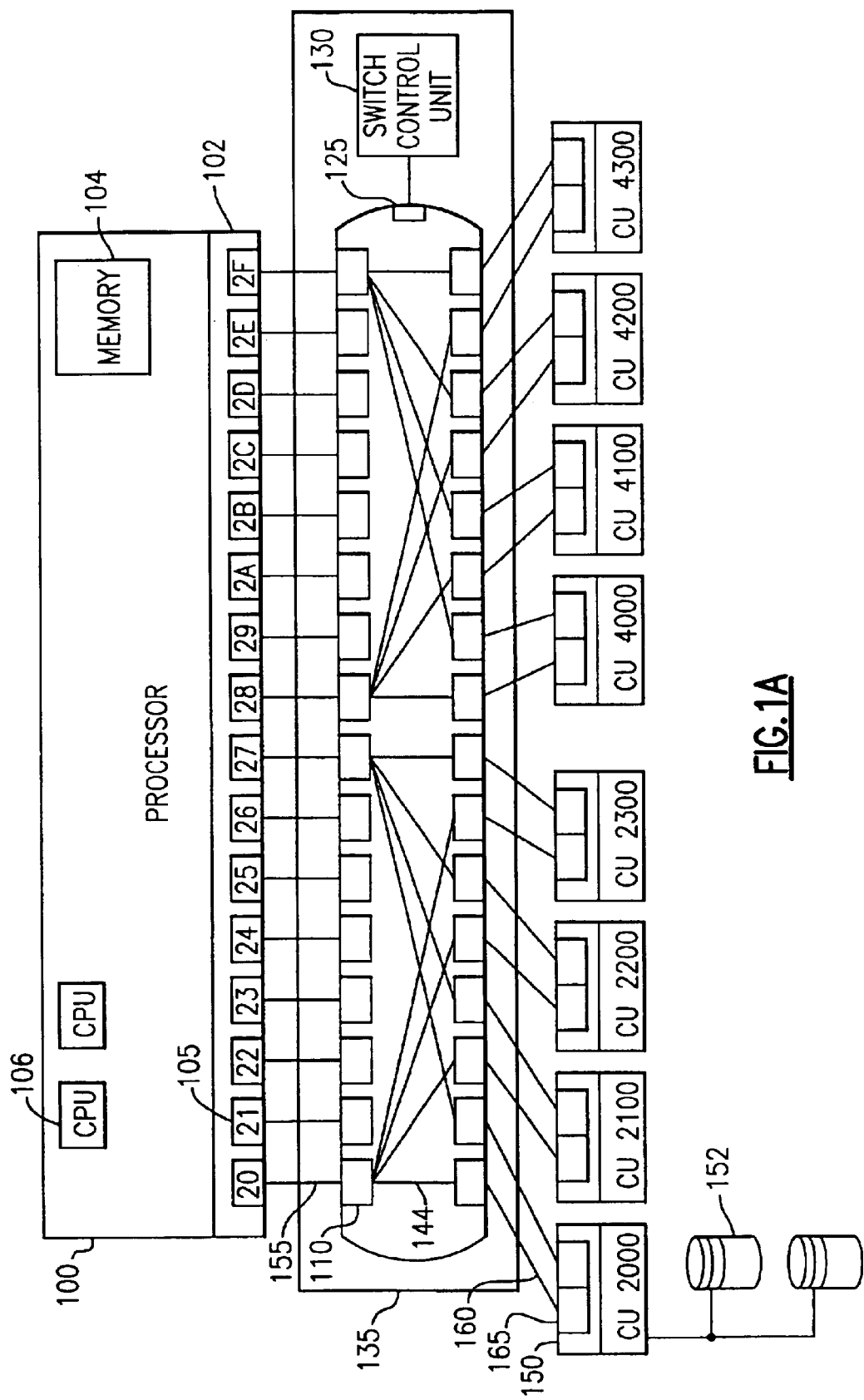
FIG. 1A illustrates a computing environment in which preferred embodiments are implemented.

One embodiment of a computing environment incorporating and using aspects of the present invention is described with reference to FIG. 1A. The computing environment contains a processor 100, which may include multiple central processing units 106 (CPUs). Processor 100 preferably includes a channel subsystem 102 to handle input/output (I/O) operations between processor memory 104 and external I/O devices 152. While a preferred computing environment employs a channel subsystem 102, the present invention is independent of whether or not processor 100 does or does not use a channel subsystem 102. Channel subsystem 102 includes a plurality of channels 105, each channel capable of forming a connection with an external device 152. In the preferred embodiment of FIG. 1A, each channel 105 is connected via a cable 155 to one of a plurality of ports 110 within switch 135. In preferred embodiments of the present invention, switch 135 is an IBM ESCON director or a FICON director, however in alternative embodiments switch 135 can be any storage network switching device. Also connected to switch ports 110 via cables 160, are a plurality of I/O device control units 150. Each control unit (CU) 150 includes one or more host adapters 165, to which a cable 160 is connected. Switch 135 further includes a switch matrix 142 (illustrated in FIG. 1B), capable of forming connections 144 between switch ports. Connections 144 are shown for illustrative purposes only, switch matrix 142 is not limited in any way to forming only the connections 144 shown in FIG. 1A. In fact, in preferred embodiments of the present invention switch matrix 142 is capable of dynamically connecting any device port 110 to any other device port 110, thereby providing dynamic anything-to-anything connections between processor 100 and CU's 150. Each CU 150 controls one or more I/O devices, such as direct access storage devices (DASD) 152. In preferred embodiments, switch 135 also contains a Switch Control Unit 130 which communicates with switch matrix 142 via a special port 125. In preferred embodiments switch 135 is an IBM ESCON director or a FICON director, and port 125 is known as the Switch Control Unit Port (CUP). The FICON interface is described in IBM publications titled "Fiber Channel Connection (FICON) I/O Interface, Physical Layer," IBM Publication No. SA24-7172-02, October 2000, and "Introduction to IBM S/390 FICON," IBM Publication No. SG24-5176-00, October 1999, both of which are hereby incorporated herein by reference in their entirety.

In a preferred embodiment of the present invention, switch 135 is an IBM ESCON director (ESCD), a first-generation SAN. The ESCD device is described in IBM publications titled "IBM ESCON Director 9032-5 Presentation," IBM Publication No. SG24-2005-00, September 1999, and "Planning for the 9032 Model 5 Director with FICON Converter Feature," IBM Publication No. SA22-7415-01, August 1999, both of which are hereby incorporated herein by reference in their entirety. As noted therein, the IBM ESCON director (ESCD) switch provides up to 248 external ports, with the ability to connect any port to any other port, up to a maximum of 124 simultaneous active connections. The ESCD switch keeps track of the devices connected to each port, as well as a set of connection attributes defining which ports can or cannot be connected to other ports. The specific connection attributes of any particular switch 135 may vary both in number and definition, in keeping with the spirit and scope of the present invention. For example, the ESCD switch allows one of several connection attributes to be assigned to each port, such as: a port may be blocked (unable to connect with any other port), a port may have a dedicated connection to another port (and therefore unable to form a dynamic connection with a different port), a port may be prohibited from connecting to another specific port, or a port may be allowed to connect with any available port. The ESCD switch manages dynamic connections between ports, within the constraints defined by the current set of port connection attributes. The set of information encompassing a) the devices connected to each port, and b) the connection attributes of each port, is referred to as the port configuration. In general, connection attributes may encompass similar or different properties, and are in no way limited to the specific connection attributes described herein in reference to a preferred embodiment. The teachings of the present invention apply without regard to either the specific connection attributes employed, or the number of such connection attributes. As used herein, the terms "port configuration" and "port status" are synonymous, and may be used interchangeably.

The port configuration of a switch such as the ESCD can be changed in a number of ways. The ESCD includes a control unit (CU) 130, frequently attached to an operator console. The port configuration can be modified by an operator via the console attached to the ESCD CU. Also, applications running on device processors attached to one or more switch ports can initiate changes to the port configuration. Since multiple processors, concurrently running multiple applications, can be attached to a particular switch, multiple host applications capable of modifying the port configuration of a single switch can be operating concurrently. Further, the port configuration could be modified via changes to the physical device connected to a port, or changes in the connection between the port and the physical device (such as a link failure or cable disconnect). Finally, in an environment using cascaded or chained switches, port configuration changes in one switch could be initiated by another connected switch. As should be apparent to one of ordinary skill in the art, in an environment where many factors can result in port configuration changes on any particular switch, there exists a need for the switch to inform connecting devices of the current port configuration.

Figure 1B:
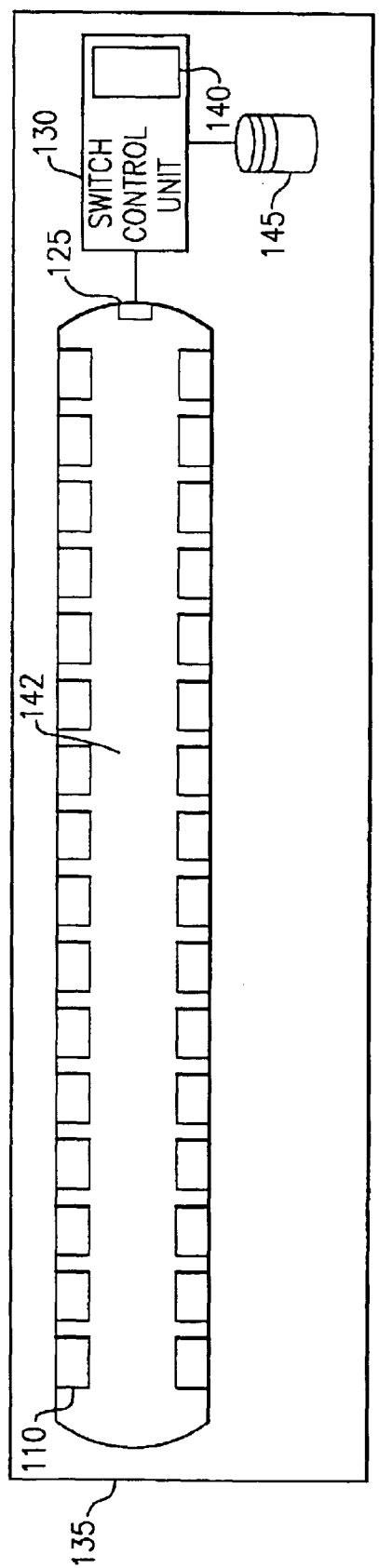
FIG. 1B illustrates a switch according to preferred embodiments of the present invention.

FIG. 1B provides additional details of switch 135. In particular, FIG. 1B illustrates switch memory 140 and switch nonvolatile memory, such as hard disk drive (HDD) 145, used to store information relating to the present configuration of ports 110. In general, such storage devices may be part of switch CU 130, or part of an operator console (not illustrated) attached to CU 130, or both. In general, only one form of storage is required, however preferred embodiments include two forms of storage as shown: a fast local memory 140, most likely volatile, and a lower performance but nonvolatile storage device 145, typically a HDD. In a preferred embodiment where switch 135 is an IBM ESCON director, nonvolatile storage 145 is the HDD of an attached operator console (not illustrated).

Switch Data Fields

Figure 3A:
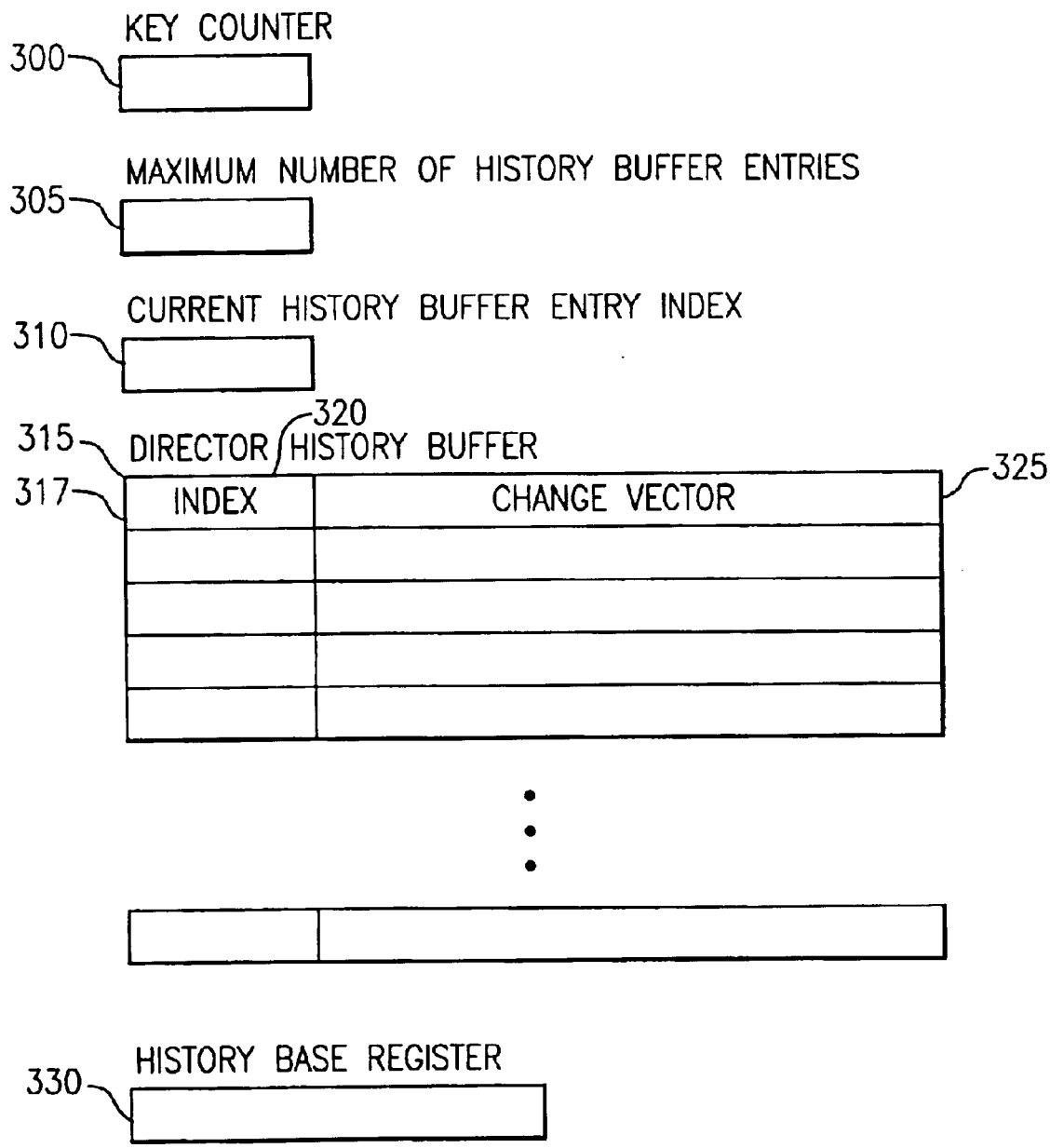
FIG. 3A illustrates fields of data stored in a switch of preferred embodiments of the present invention.

FIG. 3A illustrates the data fields of a preferred embodiment of the present invention which are stored in one or more storage devices such as memory 140 or HDD 145, within or accessible to switch 135. These data fields include the change index value 300, the Maximum number of History Buffer entries 305, the Current History Buffer Entry Index 310, the History Buffer 315, which contains a plurality of History Buffer Entries 317, each History Buffer Entry containing an Index entry 320 and a change vector 325, and finally a History Base Register 330. As used herein, the term "change index value" is a generic term for the time stamp indicator that the switch uses to identify specific configuration change events. In preferred embodiments of the present invention utilizing an IBM ESCON director or a FICON director as switch 135, change index value 300 is referred to as the Key Counter. As used herein with reference to preferred embodiments, therefore, the generic term "change index value" and the more specific term "key counter" are synonymous, and may be used interchangeably.

The Key Counter 300 is a 4 byte (32 bit) field maintained in switch 135. Key Counter 300 provides a mechanism through which an attached device, such as an application running on processor 100, can determine whether ESCON director port configuration parameters (information contained in a port information block (PIB), a port address name, the Host Data-Buffer or the Mode Register) have been modified. These parameters are documented in the "Programming the Interface for Enterprise Systems Connection Directors with FICON Converter Feature", SA23-0356-06, September 1999, which is hereby incorporated herein by reference in its entirety. Switch 135 increments Key Counter 300 each time one or more port configuration parameters are changed: by comparing the last Key Counter value known to processor 100 with the current value stored in switch 135, switch 135 is able to determine whether or not the port configuration parameters of switch 135 have changed since the time when the Key Counter value known to processor 100 was the current value within switch 135.

The Maximum Number of History Buffer Entries 305 is a 4 byte field maintained in the switch. The Maximum Number of History Buffer Entries indicates the maximum number of History Buffer Entries 317 that can be stored within the Director History Buffer 315.

The Current History Buffer Entry Index 310 contains the index of the current History Buffer Entry 317. Index 310 is used by switch 135 to point to the most recent History Buffer Entry 317 within Director History Buffer 315.

The Director History Buffer 315 contains an array of History Buffer Entries 317. The number of entries is equal to the value of the Maximum Number of History Buffer Entries 305 field. Each History Buffer Entry 317 contains two fields, and Index Entry 320 and a Change Vector 325. The Index Entry 320 is a four byte field which contains the value of the Key Counter 300 that was current when the port configuration changes indicated by the corresponding Change Vector 325 were made. The Change Vector 325 is a 256 bit field which indicates which ports were modified when the Key Counter 300 was set to the value in the corresponding Index Entry 320. In this manner, each History Buffer Entry 317 contains a pair of associated data values, indicative of when a port configuration change event occurred (Index Entry 320) and the ports affected by that change event (Change Vector 325). Each bit of the Change Vector 325 corresponds to one port within switch 135, and each port corresponds to one and only one bit within Change Vector 325. In particular, in preferred embodiments of the present invention, the leftmost bit (bit 0) represents port 0, and the rightmost bit (bit 255) represents port 255. If a bit in the Change Vector is set to 1, then a change was made to the corresponding port when the Key Counter 300 was set to the value in the Index Entry 320 corresponding to the particular Change Vector. If a bit in the Change Vector is set to 0, then no change was made to the corresponding port when the Key Counter 300 was set to the value in the Index Entry 320 corresponding to the particular Change Vector 325.

The History Base Register 330 is a 4 byte field in the switch. This field is used to pass the key counter value specified by the Test Key command to the Read History Summary command. As described below, in preferred embodiments of the present invention the History Base Register stores the value of the Key Counter passed to the switch from the requesting device as part of the Test Key command, for subsequent use by the switch in responding to a Read History Summary command. The Test Key and Read History Summary commands of preferred embodiments are described in detail below.

Processing Overview

Figure 3B:
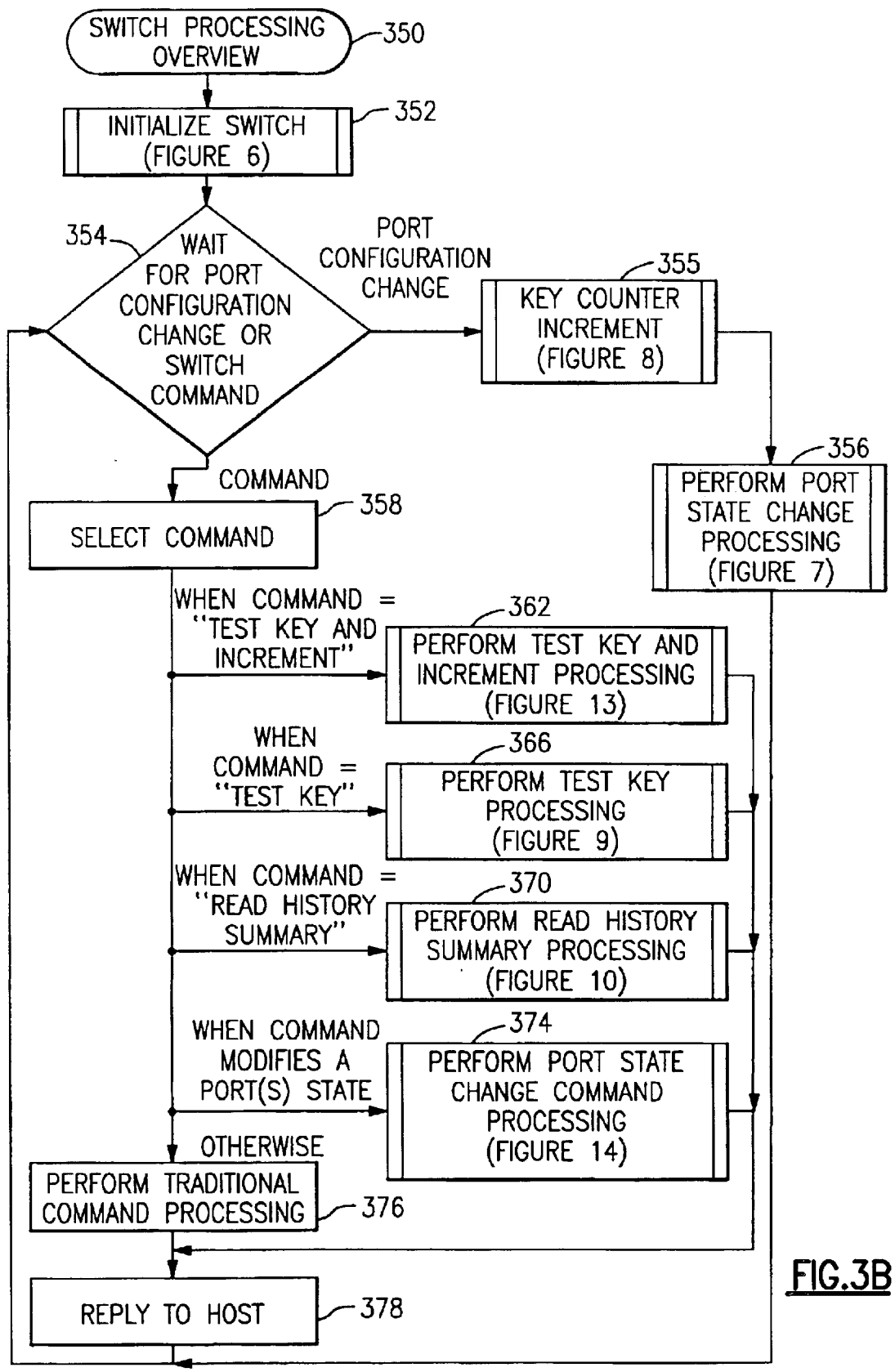
FIG. 3B provides an overview of the processing performed within a switch, according to preferred embodiments of the present invention.
Figure 3C:
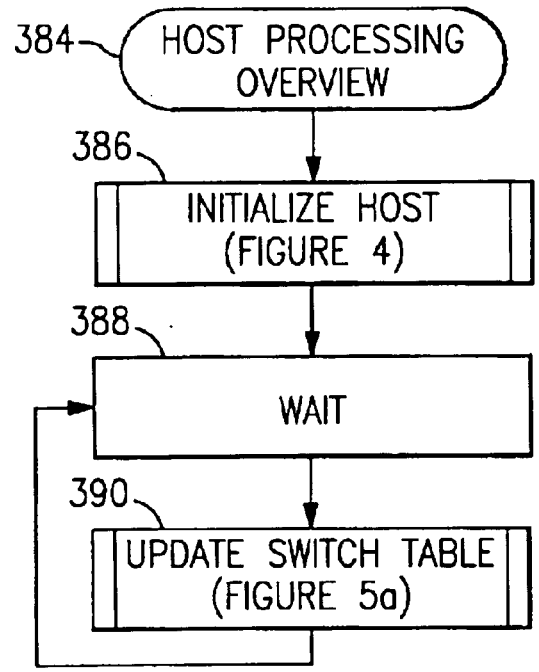
FIG. 3C provides an overview of the processing performed within a requesting device, in accordance with preferred embodiments of the present invention.

With reference now to FIGS. 3B and 3C, the overall method according to preferred embodiments of the present invention will now be described. In particular, FIG. 3B illustrates the overall method performed within switch 135. FIG. 3C illustrates the overall method performed within an attached requesting device, such as processor 100.

With reference now to FIG. 3B, an overview of switch processing is illustrated, starting at step 350. As seen in FIG. 3B, switch 135 is first initialized, step 352. Switch initialization is described in detail below, with reference to FIG. 6. Once initialized, switch 135 waits for events which modify port configuration attributes, or to process commands issued by an attached requesting device such as processor 100 or the CU 130, at step 354. In preferred embodiments, switch 135 implements step 354 as an interrupt driven process, responding to commands from attached devices or the switch CU 130.

When, at step 354, switch 135 detects an event which modifies one or more port configuration attributes, switch 135 increments Key Counter 300, step 355, then modifies the port configuration attributes and stores a data structure indicative of the changes made, step 356. The details of step 355 will be described below, with reference to FIG. 8. The details of step 356 will be described below, with reference to FIG. 7. At the completion of step 356, processing returns to step 354.

When, at step 354, switch 135 receives a command from an attached device such as processor 100 or the CU 130, processing continues at step 358. In preferred embodiments of the present invention, switch 135 is capable of responding to a variety of commands from attached devices. A few of the possible command options are illustrated in FIG. 3B. For example, switch 135 might receive a command requesting switch 135 to compare Key Counter 300 to a value provided by the attached requesting device, such as processor 100, and to increment Key Counter 300 if the values are equal, step 362. Such a command is used by an attached requesting device to initiate port configuration changes in switch 135, provided the attached requesting device holds the current Key Counter 300. Details of switch processing for such a command, step 362, are illustrated below, with reference to FIG. 13. Also for example, switch 135 might receive a command requesting switch 135 to merely perform a comparison of Key Counter 300 and a value provided by the attached requesting device, step 366. The details of switch processing for such a command, step 366, are illustrated below, with reference to FIG. 9. Further for example, switch 135 might receive one of several commands initiating changes to the configuration of one or more switch ports, step 374. The details of switch processing for such a command, step 374, are illustrated below with reference to FIG. 14.

Of particular interest in preferred embodiments of the present invention, step 370 illustrates the processing performed by switch 135 in response to a "Read History Summary" command which an attached requesting device, such as processor 100, may issue. Such a command is issued by the attached requesting device when the requesting device determines that it does not hold the current value of Key Counter 300. The requesting device may make such a determination by issuing a command such as Test Key, processed at step 366. When the requesting device determines that it does not hold the current value of Key Counter 300, the requesting device should update its port configuration data prior to initiating any further changes to the port configuration attributes or alternatively making decisions which may be based upon inaccurate (or obsolete) information. In preferred embodiments of the present invention, a command such as Read History Summary is provided to inform the requesting device of the specific ports affected by one or more configuration changes since the key value held by the requesting device was current. The details of switch processing for such a command, step 370, are described in detail below with reference to FIG. 10.

As illustrated in FIG. 3B, switch 135 may process one of several additional commands as known in the art which do not modify port state (for example "Read PIB", "Read Port Descriptors" and "Read Port Address Name"), step 376. Finally, at step 378 switch 135 issues an appropriate response to the requesting device, determined in part by the particular command. Processing within switch 135 then returns to step 354 to handle the next command or configuration change.

With reference now to FIG. 3C, the overall processing within at attached requesting device will now be described, starting at step 384, with particular emphasis on preferred embodiments wherein the requesting device is an attached host processor such as processor 100. The attached host processor is first initialized, at step 386, establishing the data structures to be used within processor 100 to store the port configuration state of one or more attached switches 135. A more detailed discussion of step 386 is provided below, with reference to FIG. 4. In preferred embodiments of the present invention, processor 100 periodically communicates with switch 135 to determine whether or not the port configuration information established during step 386 should be updated. A wait state, step 388, is therefore used to establish the communication timing intervals. In preferred embodiments of the present invention, processor 100 queries switch 135 every two minutes, however this particular timing interval is not required. Alternative embodiments of the present invention are envisioned, wherein a longer or shorter wait interval is employed. At each wait interval, processor 100 invokes the Update Switch Table process, step 390, which is described in detail below with reference to FIG. 5A. Upon completion of step 390, processing returns to step 388, until the completion of the next wait interval.

Figure 6:
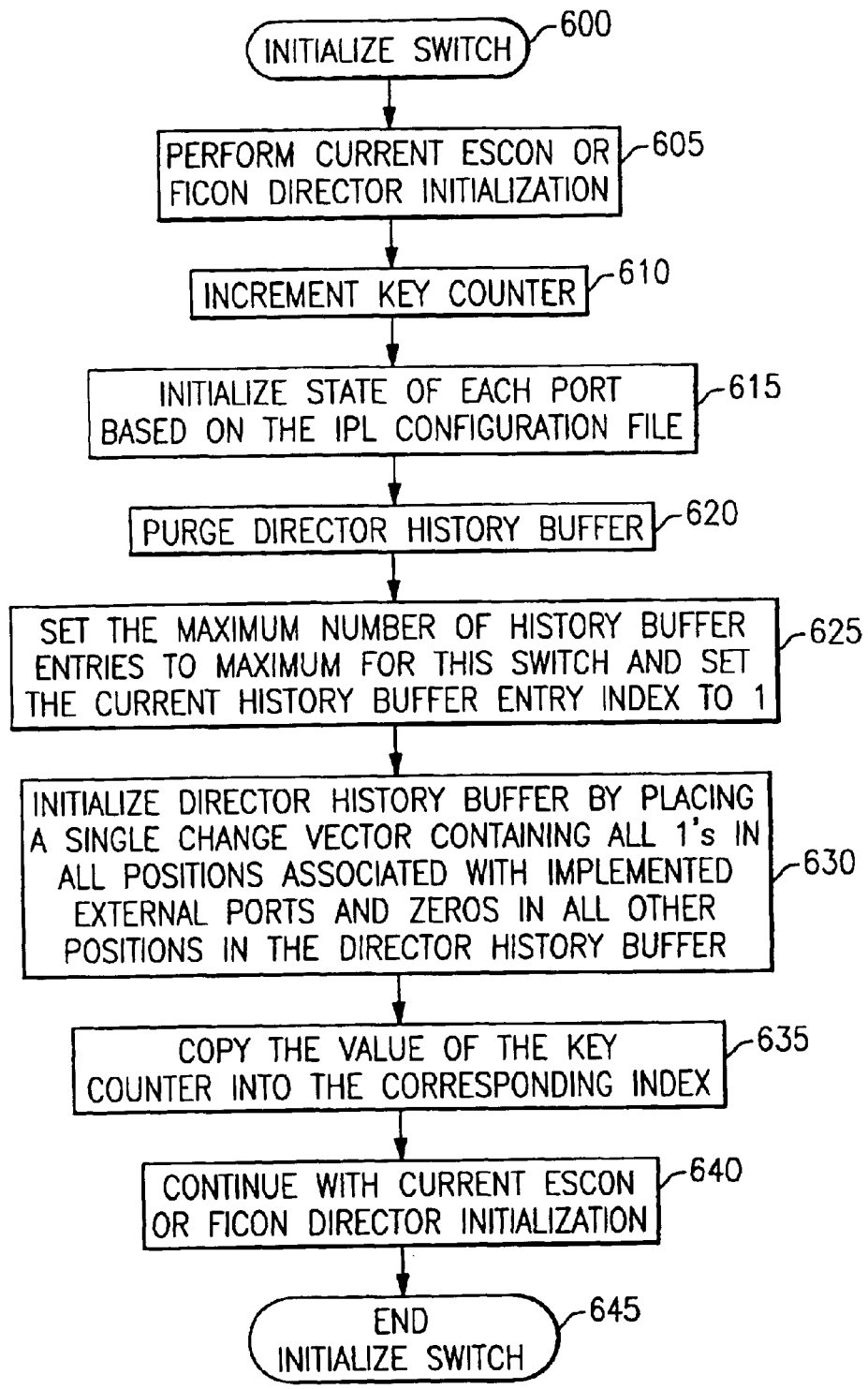
FIG. 6 illustrates logic used to initialize a switch in accordance with preferred embodiments of the present invention.

With reference now to FIG. 6, additional details of initialization step 352 will now be described. Switch 135, an ESCON or FICON director in preferred embodiments, is given control to begin processing by powering on switch 135, at step 600. Traditional switch initialization occurs at 605, which includes operations such as loading the switch microcode, initializing storage, initializing tables and state information for the switch, identifying the hardware resources available for use, processing customization information supplied by the installation. The foregoing list of operations is for illustrative purposes only, and is not an exhaustive list of initialization operations, nor are all of these initialization operations necessarily required in any particular embodiment of the present invention. During traditional switch initialization, the switch increments the Key Counter 300, at step 610. Although increment Key Counter, step 610, is illustrated following step 605 for the purpose of clarity, step 610 may alternatively be performed prior to or concurrently with any or all of the specific initialization actions performed in step 605. Traditional switch initialization continues by initializing the state of each port based on the IPL Configuration File 615. The IPL Configuration File is described in an IBM publication titled "IBM ESCON Director 9032-5 Presentation," IBM Publication No. SG24-2005-00, September 1999, which is hereby incorporated herein by reference in its entirety. As noted therein, the IPL Configuration File is a stored representation of a particular configuration of switch 135. In preferred embodiments where switch 135 is an ESCD, the IPL Configuration File is stored in nonvolatile memory 145, such as an HDD. The IPL Configuration File is used during initialization to reestablish the particular stored switch configuration as the initial switch configuration for the initialization steps. Changes to the switch port configuration, such as the addition of ports or changes to port numbers or addresses, are reflected in the initial configuration data, which is then stored in switch memory 140. At step 620, the switch purges the Director History Buffer 315 by setting the value of all History Buffer Entries 317 to binary zeroes. At step 625, the switch sets the Maximum Number of History Buffer Entries 305 to the maximum supported by this model of switch, and sets the Current History Buffer Entry Index 310 to 1, indicating that History Buffer Entry 317 number one is the current entry. The switch then, at step 630, initializes the Director History Buffer 315 by placing a single Change Vector 325 containing 1's in all positions associated with implemented external ports, and zeroes in all other positions in the Director History Buffer 315, at the History Buffer Entry 317 associated with the Current History Buffer Entry Index 310. At step 635, the switch copies the value of the Key Counter 300, which was incremented in step 610, into the Index Entry 320 portion of the History Buffer Entry 317 associated with the Current History Buffer Entry Index 310. At the completion of step 635, switch 135 is configured according to the stored IPL configuration, the History Buffer 315 is reset to zeroes in all positions except for the first History Buffer (HB) Entry 317, the History Buffer Index 310 is set to 1 and therefore points to the first HB Entry 317, and the first HB Entry 317 contains the current value of Key Counter 300 (incremented during initialization) in Index Entry 320 and a change vector 325 indicating that all implemented ports may have changed. Now, traditional switch initialization continues at step 640, and completes at step 645. During step 640, switch 135 stores information (i.e. Node Descriptors, described in detail below) describing the devices attached to each switch port.

Figure 7:
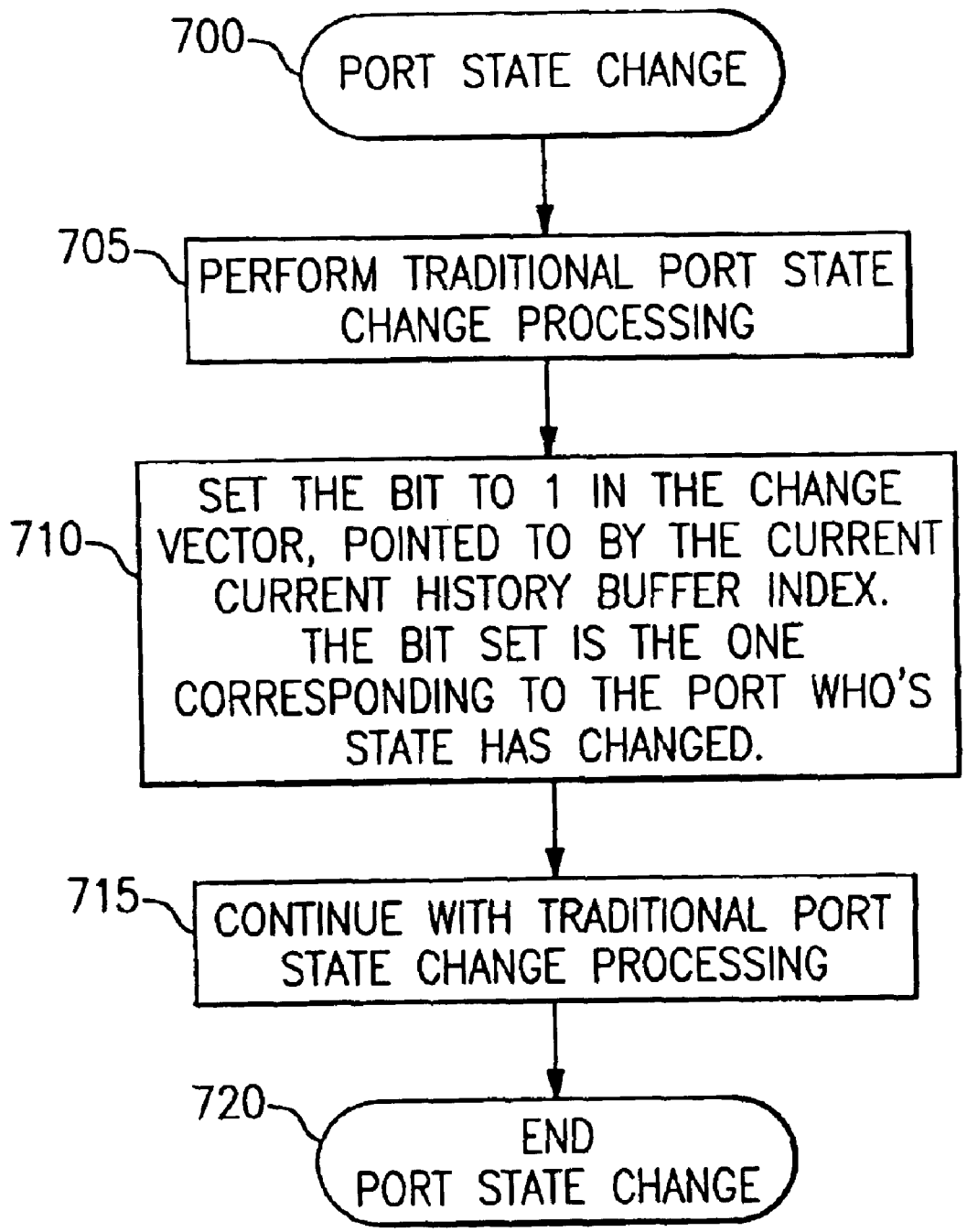
FIG. 7 illustrates logic used by a switch in response to port configuration changes, in accordance with preferred embodiments of the present invention.
Figure 8:
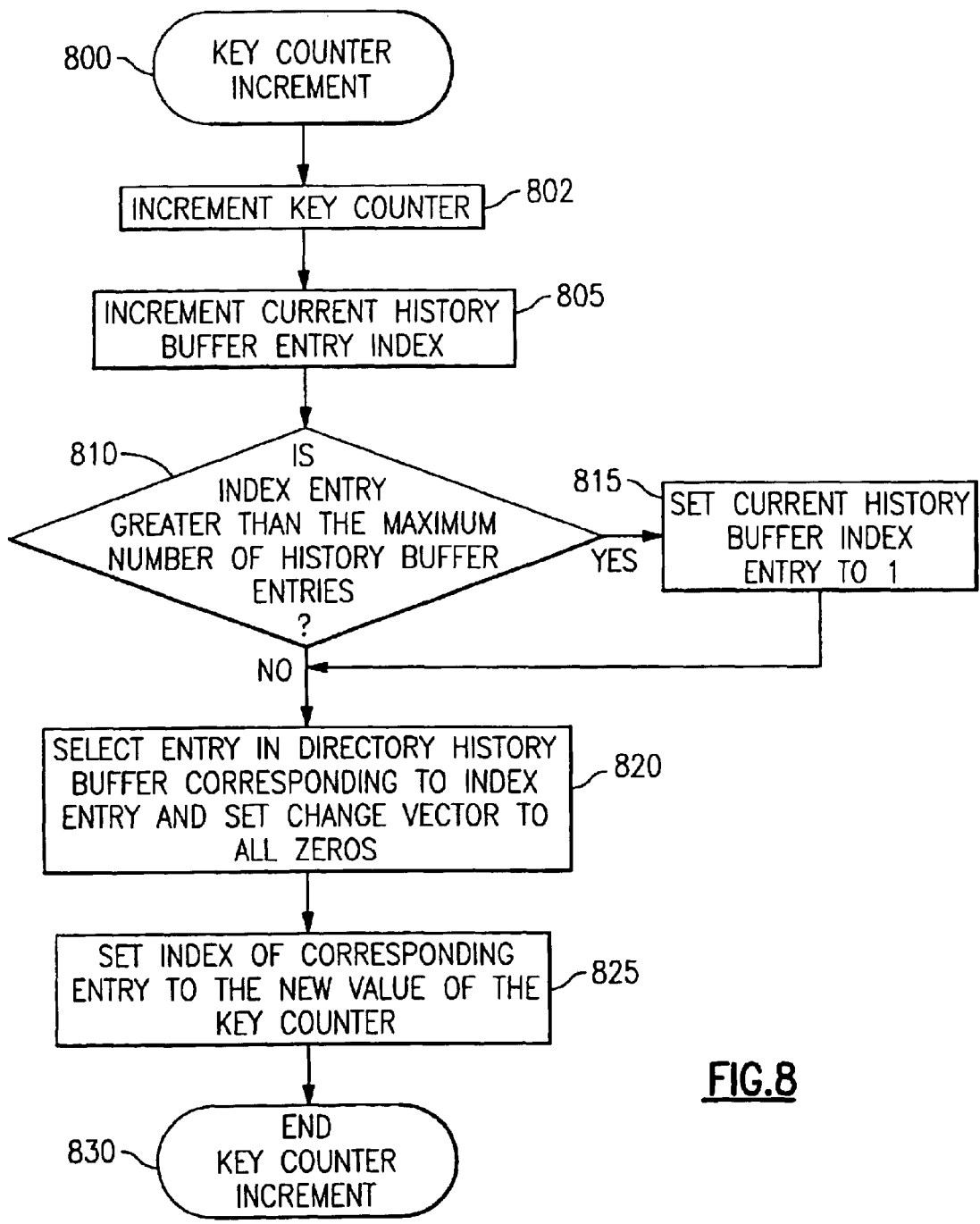
FIG. 8 illustrates logic used by the switch to increment the key counter, in accordance with preferred embodiments of the present invention.

With reference now to FIG. 8, the processing that occurs when the Key Counter is incremented will now be described, beginning at step 800. The Key Counter 300 is incremented whenever the switch port configuration is changed, whether the changes are initiated by an application running on attached processor 100, the local switch Console user, or the ESCON or FICON director hardware. In the case of host programming, modification is usually the result of a "Test Key and Increment" command, with equal comparison, described below with reference to FIG. 13. In step 802, the Key Counter 300, which is stored in the switch control unit memory 140, is incremented by 1. If there is a carryout of bit 0 (the leftmost or most significant bit) of Key Counter 300 when the Key Counter is incremented, the Key Counter 300 wraps to a value of all zeroes. In step 805, the switch 135 increments the Current History Buffer Index Entry 310. As previously noted, in practical implementations of the present invention, the Director History Buffer 315 contains a finite maximum number of entries, represented by the Maximum Number of History Buffer Entries 305 in preferred embodiments of the present invention. In preferred embodiments of the present invention, switch 135 handles the condition where the maximum number of entries is exceeded by resetting Index 310 to 1. Steps 810 and 815 describe the steps by which this condition is handled. The incremented index 310 resulting from step 805 is compared, step 810, to the Maximum Number of History Buffer Entries 305. If the Index 310 is greater than the Maximum 305, processing branches to step 815, where the Current History Buffer Entry Index 310 is set to 1. Processing then continues at step 820. If the incremented index 310 is not greater than the maximum 305, processing continues at step 820. In step 820, the Change Vector 325 within the History Buffer Entry 317 corresponding to the Current History Buffer Entry Index 310, is set to all binary zeroes. Next, at step 825, the Index 320, within the same History Buffer Entry 317 is set to the new (i.e. incremented) value of the Key Counter 300. Processing then terminates for Key Counter Increment 830. At this point, a new History Buffer Entry 317 is initialized. The initialized, or current, History Buffer (HB) Entry 317 contains an Index 320 equal to the new (incremented) Key Counter 300, and a Change Vector 325 initialized with zeroes in all bit positions. This HB entry 317 is ready for use during the next port state change operation, steps 700 through 720 of FIG. 7, described below.

With reference now to FIG. 7, the processes invoked to handle changes in port configuration will now be described, per a preferred embodiment of the present invention. When configuration information changes for a port in switch 135, switch processing begins at step 700. Next, traditional processing occurs 705, which may include updating the Port Information Blocks (PIBs), updating the Port Descriptors, or any other processing switch 135 performs to carry out the port configuration change. The switch then records the ports affected by the configuration change, by setting to a value of 1, in step 710, the bit(s) in Change Vector 325 corresponding to the port(s) affected by the configuration change implemented in step 705. Note that it is the current Change Vector 325 that is updated in step 710; the current Change Vector 325 is contained within the HB Entry 317 to which the Current History Buffer Index 310 points. Traditional port state change processing then continues, step 715, and subsequently terminates 720. At the completion of the steps illustrated in FIGS. 8 and 7, the configuration of one or more ports is changed. In response to this change a new HB Entry 317 is completed. The new HB Entry 317 contains a History Buffer Index equal to the Key Counter value after Key Counter Increment, step 802, and a Change Vector 325 indicating the ports affected by the configuration change.

Data Fields and Processing within Requesting Device

Having described the data fields and data update processes within switch 135, further details of a preferred embodiment will now be provided to illustrate the data fields and processes within an attached requesting device. In particular, a preferred embodiment wherein the requesting device is a device such as processor 100 will be described in detail.

Figure 11:
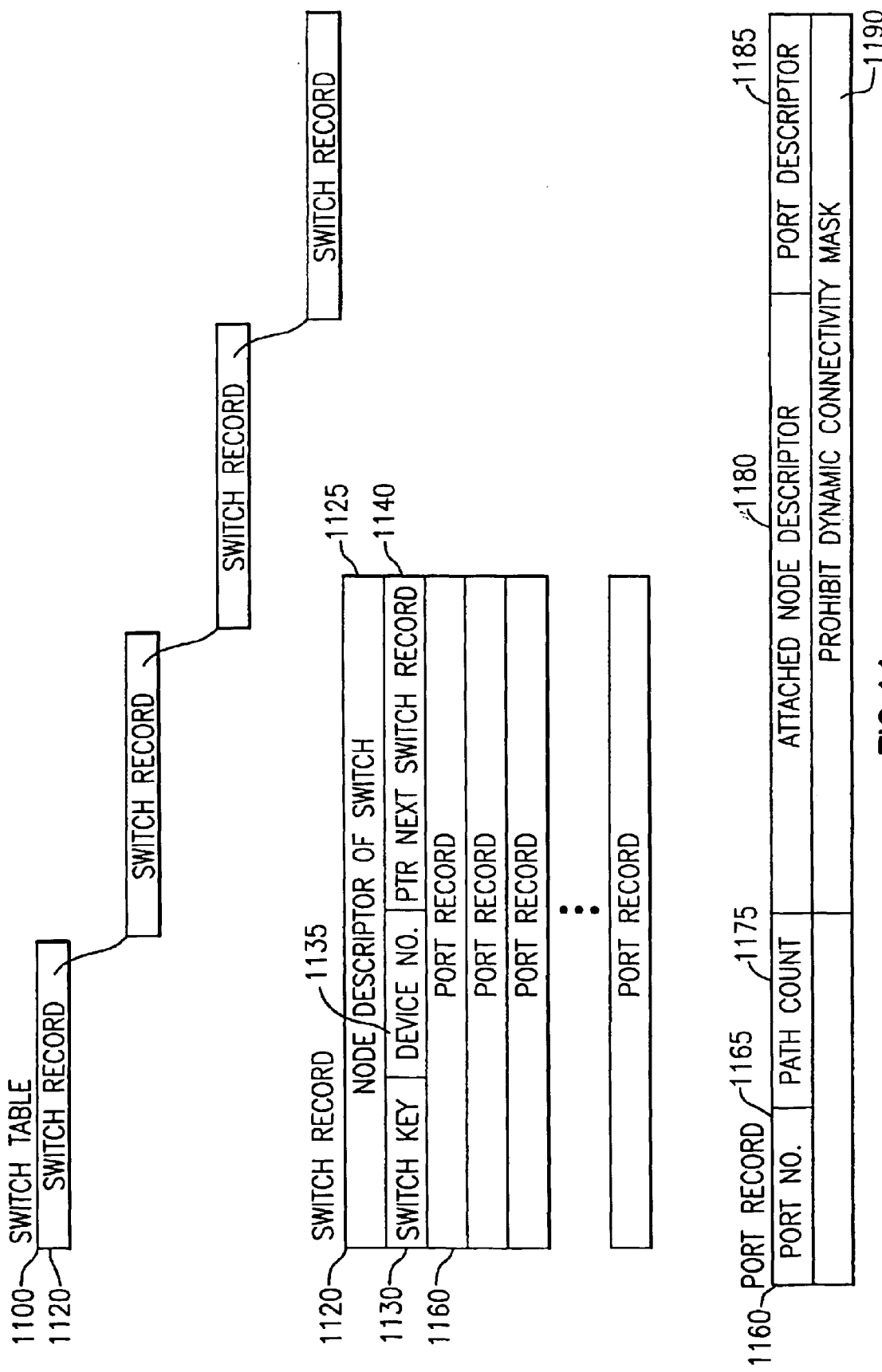
FIG. 11 illustrates the port configuration data structures and fields stored within a requesting device, according to preferred embodiments of the present invention.

With reference now to FIG. 11, the data fields and tables within the requesting device (processor 100, in a preferred embodiment) will be described. In particular, FIG. 11 illustrates the data fields in the Switch Table 1100, Switch Record 1120 and Port Record 1160. In preferred embodiments of the present invention where the requesting device is one or more processors 100, this information is stored in memory 104. Switch Table 1100 is composed of one or more Switch Records 1120. Each Switch Record 1120 is in turn composed of one or more Port Records 1160. The Switch Table 1100 represents all of the switches accessible by a particular operating system image operating within processor 100. Each Switch Record 1120 represents a single switch that is accessible by this system, and the data within a particular Switch Record 1120 describes the switch represented by the particular Switch Record 1120. The Switch Records may or may not occupy contiguous storage locations, and therefore the switch records 1120 comprising one particular Switch Table 1100 are chained together in a linked list. Each Switch Record 1120 has a Pointer 1140 to the next switch record in the Switch Table 1100, with a null value for pointer 1140 indicating the end of the Switch Table 1100. Each Switch Record contains the Node Descriptor 1125 of the switch, a copy of the Switch Key 1130 (synonymous with Key Counter, or change index value, as previously described) that was current when the Switch Record was created or last updated, the Device Number of the switch 1135, a pointer 1140 to the next Switch Record and an array of Port Records 1160, providing information on all implemented ports within switch 135. The Device Number 1135 identifies the switch device to which the I/O will be initiated. The array of port records 1160 contains a series of individual port records 1160, each record representing a specific port within switch 135. The port records 1160 are indexed by logical port address, and one port record 1160 is provided for each implemented port within switch 135. The Port Record 1160 provides information on the devices which are connected to the corresponding port. The Port Record 1160 contains a physical port number 1165, the Node Descriptor 1180 of the device attached to that port (described in detail below, with reference to FIG. 12), the Path Count 1175, which contains the total number of channels connected to this destination port; the Port Descriptor 1185 which contains various state information, like blocked, off-line, dedicated and maintenance mode; the Prohibit Dynamic Connectivity Mask 1190 which consists of a 256-bit mask in which each bit position corresponds to a specific port address. Within Mask 1190, a value of 0 in the bit position corresponding to a particular port indicates that communication with this particular port is allowed; a value of 1 indicates that communication with this particular port is not allowed. Applications running within processor 100, such as Dynamic Channel Path Manager (DCM) may use this information to avoid attempting to add paths which have been prohibited, for example, as may be the case for certain interfaces of Peer to Peer Remote Copy (PPRC) devices. Dynamic channel path management is described in a United States patent application titled "Method, System, and Program Products for Managing I/O Configurations of a Computing Environment", Ser. No. 09/407,544, having a filing date of Sep. 28, 1999, which is assigned to the same assignee as the present application, and which is hereby incorporated herein by reference in its entirety. The Path Count field, 1175, is used for ports connected to control units 150, to enable an application running on processor 100 (such as DCM) to identify unused ports.

Figure 12:
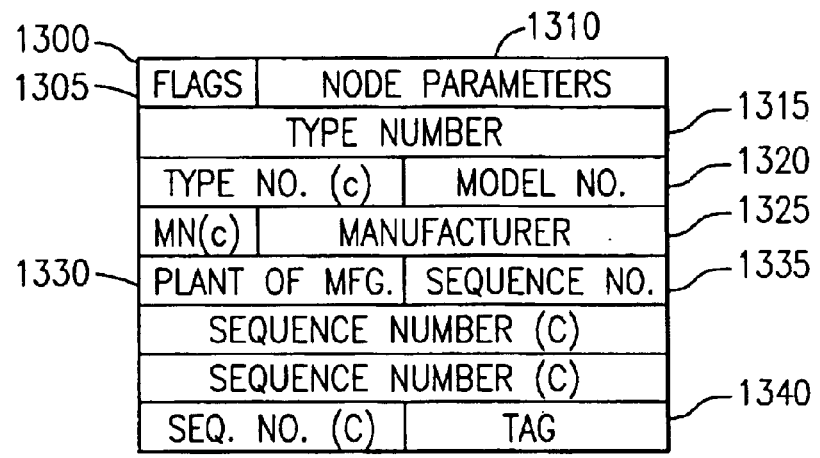
FIG. 12 illustrates the Node Descriptor data structure of preferred embodiments of the present invention.

FIG. 12 illustrates additional details of the node descriptor (ND) data field of preferred embodiments of the present invention. As noted above, the ND field provides information describing the physical device attached to a particular port. The Node Descriptor contains the following fields: Flags (1305), Node Parameters (1310), Type Number (1315), Model Number (1320), Manufacturer (1325), Plant of Manufacture (1330), Sequence Number (1335), and Tag (1340). Details of each field are provided below:

1. Flags (1305): Byte 0 contains flags which describe the manner in which selected fields of the node descriptor are to be interpreted.
2. Node Parameters (1310): Bytes 1–3 contain additional information about the node.
3. Type Number (1315): Word 1 and bytes 0–1 of word 2 contain the six-character (0–9) EBCDIC type number of the SDC. The type number is right justified with leading EBCDIC zeros if necessary.
4. Model Number (1320): Bytes 2–3 of word 2 and byte 0 of word 3 contain, if applicable, the three-character (0–9 or uppercase A–Z) EBCDIC model number of the SDC. The model number is right justified with leading EBCDIC zeros if necessary.
5. Manufacturer (1325): Bytes 1–3 of word 3 contain a three-character (0–9 or uppercase A–Z) EBCDIC code that identifies the manufacturer of the SDC, for example, "IBM".

6. Plant of Manufacture (1330): Bytes 0–1 of word 4 contain a two-character (0–9 or uppercase A–Z) EBCDIC plant code that identifies the plant of manufacture for the SDC.
7. Sequence Number (1335): Bytes 2–3 of word 4, words 5–6, and bytes 0–1 of word 7 contain the 12-character (0–9 or uppercase A–Z) EBCDIC sequence number of the SDC. The sequence number is right justified with leading EBCDIC zeros if necessary. A serial number consists of the concatenation of the plant-of-manufacture designation with the sequence-number designation.
8. Tag (1340): Bytes 2–3 of word 7 contain the physical identifier for the SDC interface that is identified by the preceding 26 bytes of the node descriptor.

Figure 4:
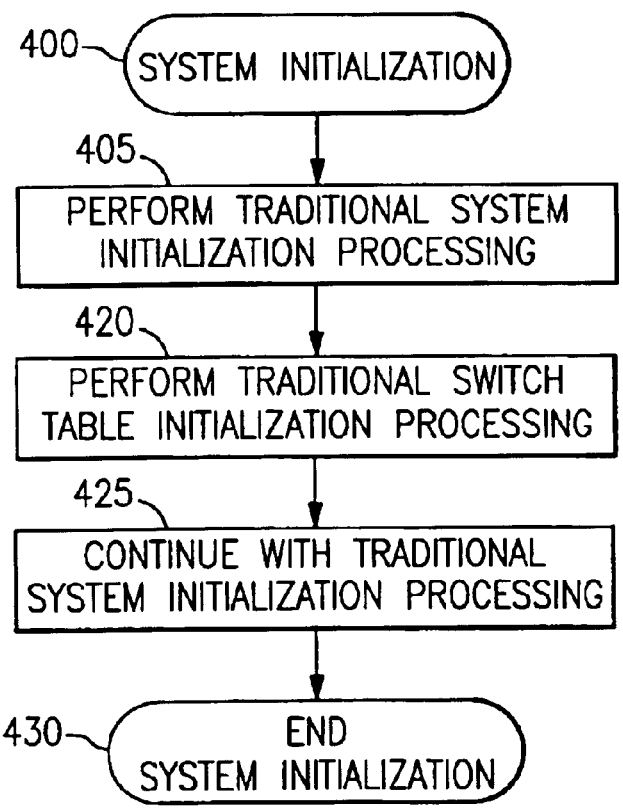
FIG. 4 illustrates logic used to initialize a requesting device in accordance with preferred embodiments of the present invention.

Initialization of the attached requesting device, such as processor 100, will now be described with reference to FIG. 4. In preferred embodiments of the present invention, processor 100 is an IBM zSeries™, running an operating system such as the IBM Z/OS™. The IBM zSeries is described in an IBM publication titled "zSeries 900 System Overview," IBM Publication No. SA22-1027-00, October 2000, and IBM z/OS is described in an IBM publication titled "z/OS Introduction and Release Guide," IBM Publication No. GA22-7502-00, March 2001, both of which are hereby incorporated herein by reference in their entirety. While the following description of a preferred embodiment will focus on z/OS, those of ordinary skill in the art should readily realize that other embodiments are possible, utilizing other processors and other operating systems, in keeping within the spirit and scope of the present invention. At the start of initialization, the operating system is given control to begin processing, step 400. Traditional z/OS operating system initialization occurs, step 405 which includes loading the system code from the initial program load (IPL) device, initializing storage, initializing tables and state information for the operating system, identifying the hardware resources available for use, processing customization information supplied by the installation, etc. The foregoing list of operations is for illustrative purposes only, and is not an exhaustive list of initialization operations, nor are all of these initialization operations necessarily required in any particular embodiment of the present invention. During traditional z/OS operating system initialization the operating system performs Switch Table Initialization processing 420 to build a switch record 1120 for each attached switch, thereby creating data structures which represent the I/O topology at the time of processor initialization. During switch table initialization processing, step 420, the system reads the current Key Counter 300 and Node Descriptor 1300 of all online switches, then saves the Key Counter 300 and Node Descriptor 1300 for each switch in the Switch Record 1120. As previously indicated, the current value of Key Counter 300 is stored in the Switch Key 1130 field within the switch record 1120 corresponding to this switch. The Node Descriptor (ND) 1300 of the switch is stored in the Node Descriptor of Switch 1125 field, within the same switch record 1120. After all the online switches attached to processor 100 have been processed, step 420, the operating system within processor 100 continues its traditional system initialization, step 425. The system initialization processing then completes, step 430.

Communication Processes and Protocols

Having described the data structures and initialization processes of preferred embodiments of the present invention pertaining to processor 100, the processes and communication protocols by which switch 135 and processor 100 communicate regarding port configuration changes will now be described.

In order for a host program to determine if a switch supports the Read History Summary command, the General node-element qualifier (NEQ) returned by the "Read Configuration Data" command is modified. The general NEQ is documented in an IBM publication titled "ESA/390 Common I/O-Device Commands and Self Description," SA22-7204-02, August 1995, which is hereby incorporated herein by reference in its entirety. Byte 0 of word 4 contains the History Buffer Entries field. This field indicates whether or not the Director History Buffer is supported by a particular switch, and if it is supported, the field indicates the number of units of history buffer entries which are implemented in the particular switch. When set to x'00', neither the Director History Buffer nor the Read History Summary command is supported. When set to a value other than x'00', the field contains an 8-bit unsigned binary integer whose value indicates the number of Directory History Buffer entries that are implemented on this switch. In alternative embodiments, the value may indicate a number of units, where one unit contains more than one entry, such that the number of buffer entries that are implemented is the integer contained in this field times the number of entries per unit. In prior switches, this History Buffer Entries field was a reserved field, and defined to be binary zeroes, so that a prior switch will correctly indicate that it does not support the new Read History Buffer command. By first issuing the Read Configuration Data command, and inspecting the History Buffer Entries field, the host program can avoid issuing the Read History Buffer command to a switch which does not support it.

Figure 5A:
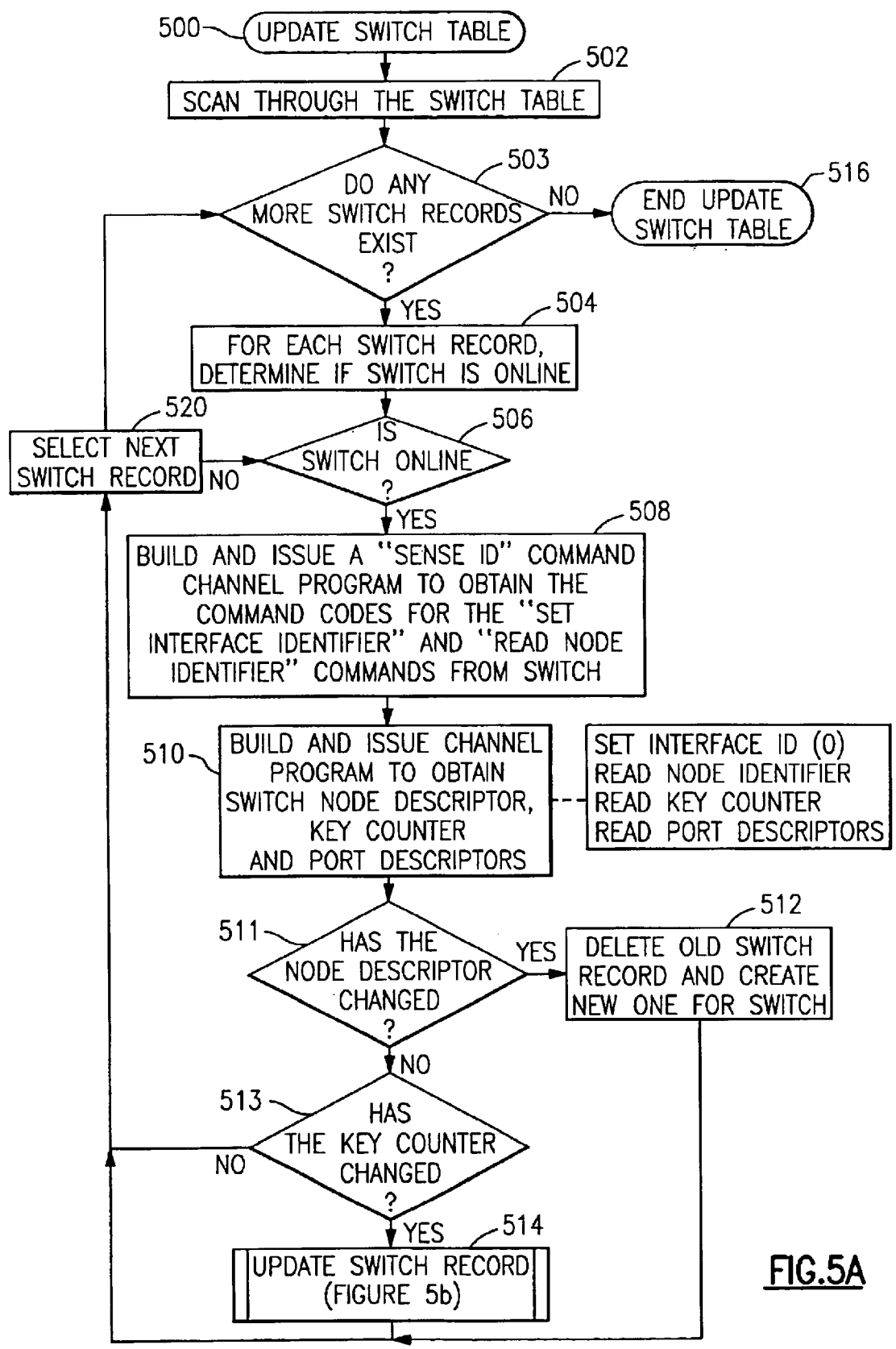
FIG. 5A illustrates logic used by a requesting device to update internal switch tables in accordance with preferred embodiments of the present invention.

With reference now to FIG. 5A, an overview of the periodic data update process performed within an attached requesting device, such as processor 100, will now be described. FIG. 5a shows the processing that occurs when processor 100 updates its Switch Table 1100. As previously described, the Switch Table 1100 is built during initialization (see FIG. 4, step 420). Since port configuration changes may be initiated by any one of a number of devices, processor 100 periodically updates Switch Table 1100. In preferred embodiments of the present invention, the Update Switch Table 500 process is called every two minutes in order to maintain current information in Switch Table 1100. Other embodiments employing different time intervals are possible, and may be desirable in some situations, and are therefore contemplated within the spirit and scope of the present invention. Updating switch table 1100 begins by scanning through the existing switch table, step 502. Processor 100 next determines whether there are Switch Records 1120 remaining, step 503. If processor 100 holds Switch Records 1120 remaining which may need updating, processing continues at step 504. For each Switch Record 1120 within the Switch Table, processor 100 finds the Unit Control Block (UCB) which represents the switch device. The UCB contains a bit that indicates if the switch device is online or offline, step 504. If processor 100 determines that the switch is not online 506, processor 100 selects the next switch record, step 520, and continues at step 503. If processor 100 determines that the switch is online 506, processor 100 builds and issues a "Sense ID" command channel program to obtain the command codes for the "Set Interface Identifier" and "Read Node Identifier" commands from the switch 135, at step 508. This step is performed to accommodate various switches and their associated control commands and protocols. Building Channel Programs is documented in an IBM publication titled "z/Architecture—Principles of Operation," SA22-7832-00, December 2000, which is hereby incorporated herein by reference in its entirety. The Sense ID command is documented in an IBM publication titled "ESA/390 Common I/O-Device Commands and Self Description," SA22-7204-02, August 1995, which is hereby incorporated herein by reference in its entirety. In particular, the Read Node Identifier command requests a Node Identifier from switch 135, where the Node Identifier contains the Node Descriptor (ND) previously described with reference to FIG. 12. After obtaining the command codes for the "Set Interface Identifier" and "Read Node Identifier" commands, a channel program is built, step 510, to obtain the switch node descriptor, key counter, and port descriptors of switch 135. To accomplish this, the following channel commands are chained together in this order; Set Interface ID with a Node Selector equal to zero; Read Node Identifier; Read Key Counter; and Read Port Descriptors. These commands are documented in an IBM publication titled "Programming the Interface for Enterprise Systems Connection Directors with FICON Converter Feature", SA23-0356-06, September 1999, which is hereby incorporated herein by reference in its entirety. After obtaining the Node Descriptor and Key Counter, these values are compared, at steps 511 and 513, to the values currently in the switch record for this particular switch, which is stored within processor 100. First, processor 100 determines if switch 135 is precisely the same device that had this particular device number 1135 during the previous update interval, at step 511. In preferred embodiments of the present invention, this step is accomplished by comparing the Node Descriptor (ND) of switch 135 to the ND last known to processor 100. The specific data comprising a Node Descriptor in accordance with preferred embodiments is described below, with reference to FIG. 12. If switch 135 is not precisely the same device (ND's do not match), then processor 100 refreshes the port configuration information for all implemented ports within new switch 135, step 512. This step is similar to the procedures performed during initialization, as illustrated in FIG. 4. Once a new switch record is created at step 512, processing continues at step 520 (next switch record).

If, at step 511, processor 100 determines that switch 135 is the same device that had this particular device number 1135 during the previous interval, processing continues at step 513. At step 513, processor 100 determines whether or not the current Key Counter 300 value within switch 300 matches the most recent value known to processor 100. If, at step 513, processor 100 determines that the value of Key Counter 300 has not changed since the previous interval (i.e. processor 100 holds the current value of Key Counter 300), no further action is taken for this Switch Record, and processing continues to step 520 (next switch record). If, however, the current value of Key Counter 300 within switch 135 does not match the value known to processor 100, further action is taken to update the configuration information within processor 100, at step 514. The Update Switch Record process is called at step 514; this process is described in detail below, with reference to FIG. 5B. After returning from Update Switch Record 514, processing continues by selecting the next switch record, step 520. After selecting the next switch record, step 520, processing continues at step 503. When all switch records have been updated, step 503, processing ends, step 516.

Figure 5B:
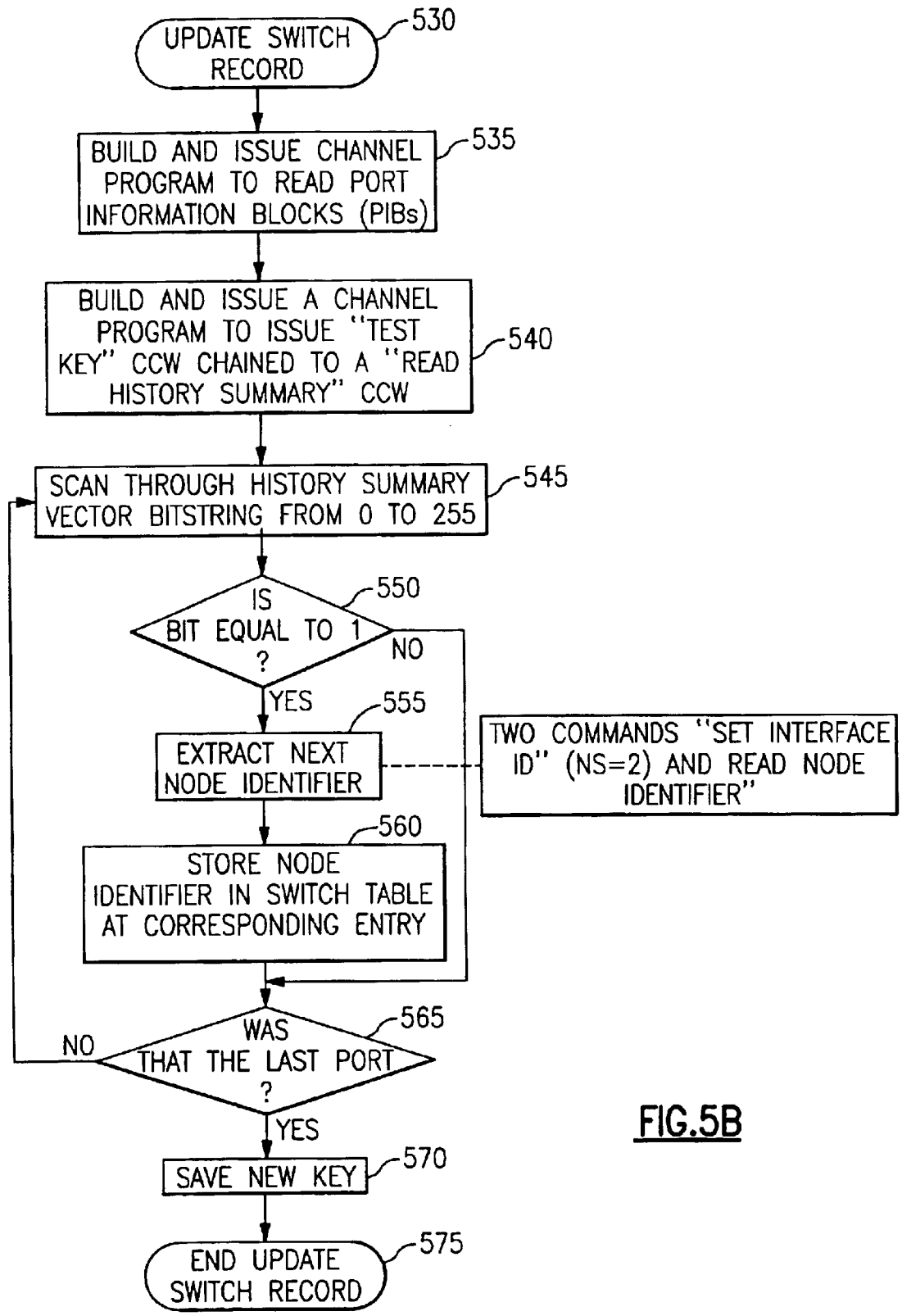
FIG. 5B illustrates logic used by a requesting device to update switch records in accordance with preferred embodiments of the present invention.

With reference now to FIG. 5B, the process used by processor 100 to update switch records will now be described. Update Switch Record 530 is invoked at step 514 in FIG. 5a. Processing begins by building and issuing a channel program to read Port Information Blocks (PIBs) from the switch, step 535. A channel program is then built, step 540, to obtain the history summary vector from switch 135. This is accomplished by building a channel command word (CCW) to issue the Test Key command, and chain it to a CCW to issue the Read History Summary command. A discussion of these commands and the use of command chaining follows, with reference to FIGS. 2A through 2D. Additional details of the command structures and protocols of preferred embodiments of the present invention will be described below. With additional reference now to FIG. 2, the Test Key CCW 200 is built by storing a value of '0D'x in the command code 205, storing a value of '40'x in the Flags field 210, indicating command chaining is on, storing a value of '0004'x in the Count field 215, indicating a data transfer of four bytes, and in the Data Address field 220, a pointer to field 240 containing the value of the current key counter field from the switch record 1130. The Read History Summary CCW 260 is built by storing a value of '0E'x in the command code field 265; storing a value of '00'x in the Flags field 270, indicating that command chaining is off; storing a value of '24'x in the Count field 275, indicating a transfer of 36 bytes; and in the Data Address field 280, a pointer to the place where the output of the Read History Summary command is to be placed 285. The channel program is then started via the Start Subchannel (SSCH) command. When the channel program completes, each bit of the History Summary Vector 290 is scanned, step 545. Starting with the leftmost bit in the History Summary Vector 290, bit 0, where bit 0 represents port 0, bit 1 represents port 1, etc.; the program checks to see if the bit is equal to 1, at step 550. If the bit is not equal to 1, processing continues at step 565. If the bit is equal to one, then information in the switch record for this port should be updated, and processing continues at step 555. In step 555, a channel program is built and issued to read the attached node identifier at the port corresponding to the bit in the History Summary Vector 290. The Switch Record is then updated with the newly obtained node identifier, at step 560. If this is not the last bit (representing the last port) in the bit string, step 565, then processing continues at step 545 by selecting the next bit in the bit string. If it is the last bit in the bit string, step 565, then the key counter in the switch record 1130 is updated, at step 570, with the New History Buffer Index 295. Update Switch Record processing then terminates, step 575.

Specific details of the communication protocols and commands of preferred embodiments of the present invention will now be described. In particular, the commands by which processor 100 queries switch 135, and requests a history summary, are described below.

Before discussing the commands in detail, a preliminary discussion of command chaining will be provided. In general, command chaining is a method known in the art, whereby a series of channel commands are "chained" together for execution. Chaining a series of commands insures that each command in the chain is executed, prior to completion of the channel program. As used in preferred embodiments of the present invention, command chaining is employed to chain two specific commands together: a command by which a requesting device determines whether it has the most recent Key Counter (the Test Key command), and a command by which a requesting device determines which port configuration attributes have been modified (the Read History Summary command). By chaining these commands, processing insures that no other processes intervene between the Test Key and Read History Summary commands, potentially causing the value specified in the Test Key command to be overwritten before the Read History Summary executes and is able to extract the value specified in the Test Key command from the History Base Register 330. The command structure of preferred embodiments further uses a No-op command, the purpose of which will be fully described below.

Figure 2A:
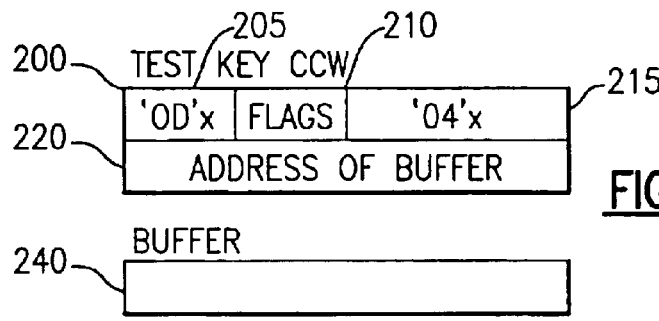
FIG. 2A illustrates fields of data included in a Test Key channel command word (CCW) of preferred embodiments of the present invention.

With reference now to FIG. 2A, the Test Key channel command will be described. This command is issued by the requesting device, such as processor 100, to determine if the Key Counter value held by the requesting device (Switch Key 1130 of FIG. 11, stored within the switch record 1120 corresponding to switch 135) is the current value stored in switch 135. FIG. 2A illustrates the details of the fields in the Test Key channel command of a preferred embodiment of the present invention. The Test Key Channel Command Word 200 is the channel command word (CCW) for the test key command. Bits 0–7 of the Test Key CCW contain the Test Key Channel Command code 205, which is '0D'x in preferred embodiments. Bits 8–15 contain Test Key Flags 210, which affect the processing of the channel program, as described in detail below for preferred embodiments:

Chain-Data (CD) Flag: Bit 8, when equal to 1, specifies chaining of data. It causes the storage area designated by the next CCW to be used with the current I/O operation. When the CD flag is one in a CCW, the chain-command and suppress-length-indication flags (see below) are ignored.

Chain-Command (CC) Flag: Bit 9, when equal to 1, and when the CD flag and S flag are both zeros, specifies chaining of commands. It causes the operation specified by the command code in the next CCW to be initiated on normal completion of the current operation.

Suppress-Length-Indication (SLI) Flag: Bit 10 controls whether an incorrect-length condition is to be indicated to the program. When this bit is equal to 1 and the CD flag is zero, the incorrect-length indication is suppressed. When both the CC and SLI flags are ones, and the CD flag is zero, command chaining takes place, regardless of the presence of an incorrect-length condition. This bit should be specified in all CCWs where suppression of the incorrect-length indication is desired.

Skip (SKIP) Flag: Bit 11, when equal to one, specifies the suppression of transfer of information to storage during a read, read-backward, sense ID, or sense operation.

Program-Controlled-Interruption (PCI) Flag: Bit 12, when equal to one, causes the channel subsystem to generate an intermediate interruption condition when the CCW takes control of the I/O operation. When the PCI flag bit is zero, normal operation takes place.

Indirect-Data-Address (IDA) Flag: Bit 13, when equal to one, specifies indirect data addressing.

Suspend (S) Flag: Bit 14, when equal to one, specifies suspension of channel-program execution. When valid, it causes channel-program execution to be suspended prior to execution of the CCW containing the S flag. The S flag is valid when bit 4, word 1 of the associated operation request block (ORB) is one.

Bit 15 is reserved, and is zero.

Bits 16–31 contain the length of data to be transferred during execution of this instruction, referred to as the Test Key Byte Count 215. For the Test Key command of preferred embodiments, this is '04'x. Bits 32–63 of the CCW contain the Address of Buffer Test Key Value 220, which is the address of the buffer where the input is fetched from memory by the channel, referred to as the Buffer Test Key Value 240. Buffer Test Key Value 240 is a buffer where the input is fetched from memory by the channel. For this command code it will receive the test key value, a four byte field, which contains the key value which the requesting device, such as processor 100, compares with the current key value in the switch.

Figure 2B:
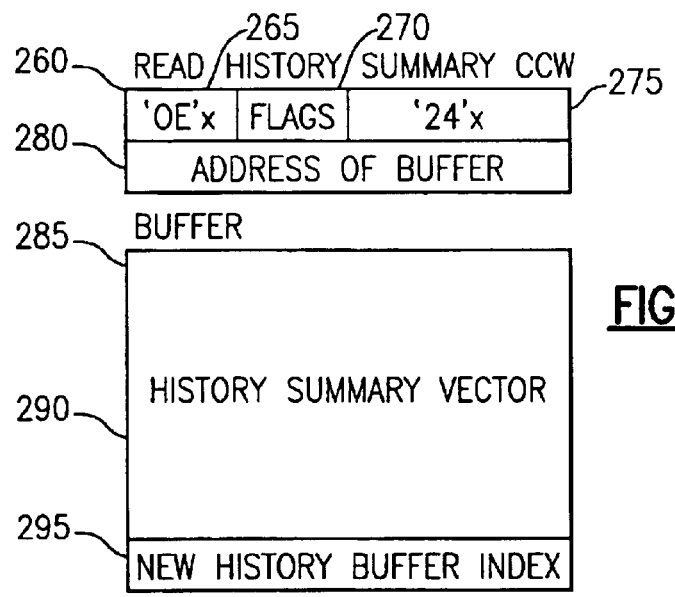
FIG. 2B illustrates fields of data included in a Read History Summary CCW of preferred embodiments of the present invention.

With reference now to FIG. 2B, the Read History Summary command will be illustrated. FIG. 2B illustrates the details of the fields in the Read History Summary channel command. Read History Summary Channel Command Word 260 is the channel command word (CCW) for Read History Summary. Bits 0–7 of the Read History Summary CCW contain the Read History Summary Channel Command Code 265, which is '0E'x in preferred embodiments of the present invention. Bits 8–15 contain Flags 270, used during the Read History Summary command processing, which affect the processing of the channel program. The definition of these bits are the same as for the Test Key Flags 210, previously discussed with reference to FIG. 2A. Bits 16–31 contain the Read History Summary Byte Count 275, which represents the length of data to be transferred during execution of this instruction. For the Read History Summary channel command of preferred embodiments, this is '24'x. Bits 32–63 of the CCW contain the Address of Read History Summary Results 280, which represents the buffer address where the results of the Read History Summary command are stored. Read History Summary Results 285 is a 36 byte field which contains the results of the Read History Summary command which are returned to the requesting device by the switch. The History Summary Vector 290 is a 256 bit field which indicates which ports were modified from the time the switch Key Counter 300 was equal to the value in the History Base Register 330 (which is equal to the value of the Key Counter passed to the switch by the requesting device via the buffer 240), to the current value of the Key Counter 300. The individual bits of History Summary Vector 290 bear a one to one correspondence to the ports within switch 135, with the leftmost bit, bit 0, representing port 0, and the rightmost bit, bit 255 representing port 255. If a particular bit in the History Summary Vector 290 is set to 1, then a change was made to the corresponding switch port configuration during the time period represented by this particular History Summary Vector. If a bit in the History Summary Vector 290 is set to 0, then no change was made to the corresponding port configuration during the time period represented by this particular History Summary Vector. The New History Buffer Index field 295 is a 4 byte field which contains the value of the current Key Counter 300 stored within switch 135, when the Read History Summary command was issued. The requesting device, such as processor 100, can use this Key Counter value as the starting point for determining if changes have been made subsequent to its last invocation of Read History Summary.

Figure 2C:
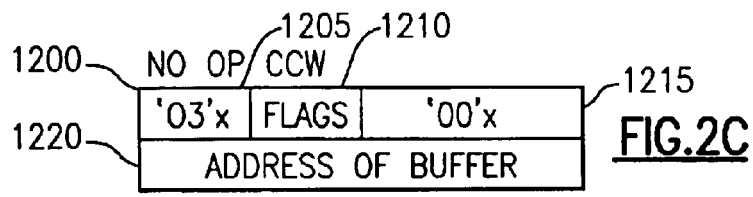
FIG. 2C illustrates fields of data included in a No Operation CCW of preferred embodiments of the present invention.

With reference now to FIG. 2C, the No-Operation (or no-op) command will be illustrated. FIG. 2c shows the details of the fields in the No-Operation channel command. No-Operation Channel Command Word 1200 is the channel command word for No-Operation. Bits 0–7 of the CCW contain the No-Operation Channel Command Code 1205, which is '03'x. Bits 8–15 contain Flags 1210 which may be used with the No-Operation command, which affect the processing of the channel program. The definition of these bits are the same as for the Test Key Flags 210 previously described. Bits 16–31 contain the No-Operation Byte Count 1215, which represents the length of data to be transferred during execution of this instruction. For the No-Operation command, this is '00'x. Bits 32–63 of the CCW contain the Address of No-Operation Results 1220, which should be set to binary zeroes, since a No-Operation command transfers no data.

Figure 2D:
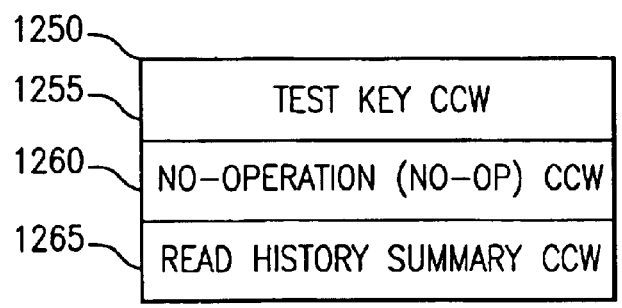
FIG. 2D illustrates command chaining of preferred embodiments of the present invention.

With reference now to FIG. 2D, the chaining of the "Test Key," "No-Operation," and "Read History Summary" commands used in preferred embodiments of the present invention will be illustrated. FIG. 2d shows the details of how these CCWs are placed in memory 1250. In order to issue the Read History Summary command, the Read History Summary command is preceded by, and chained to, a Test Key command. This is normally done by placing the Test Key CCW first in storage 1255, followed directly by (and adjacent in memory to) a No-Operation CCW 1260, followed directly by (and adjacent in memory to) a Read History Summary CCW 1265. Typically, the Chain-Command bit in the Test Key CCW flags 210 is set on, while the Chain-Command bit in the No-Operation CCW flags 1210 and the Read History Summary CCW flags 270 are set to zero. As a result, when the Test Key command completes, if the "Test Key Value" is equal to the "Key Value" (step 915 of FIG. 9), Test Key will present Normal Ending Status (step 925 of FIG. 9). This causes the channel subsystem to execute the next CCW, which in this case is the No-Operation CCW. Since the Chain-Command bit is off, after the no-op is executed, the channel command will terminate. If the "Test Key Value" is not equal to the "Key Value" (step 915 of FIG. 9), Test Key will still present Normal Ending Status, but in addition sets the Status Modifier flag on (step 920 of FIG. 9). Returning a value of one for the Status Modifier flag causes the channel subsystem to skip over the next CCW 1260, and instead process the one after that 1265, which is the Read History Summary CCW. After executing the Read History Summary command, the channel program will end since the Chain-Command bit is off in this CCW 1265 also. In order to determine whether step 920 or step 925 executed, the CCW address within the Subchannel Status Word (SCSW) within the Interruption Request Block (IRB) is examined. This field will contain the address of the last CCW executed, plus 8. The SCSW and IRB are documented in an IBM Publication titled "z/Architecture—Principles of Operation", IBM Publication No. SA22-7832-00, December 2000, which is hereby incorporated herein by reference in its entirety.

Figure 9:
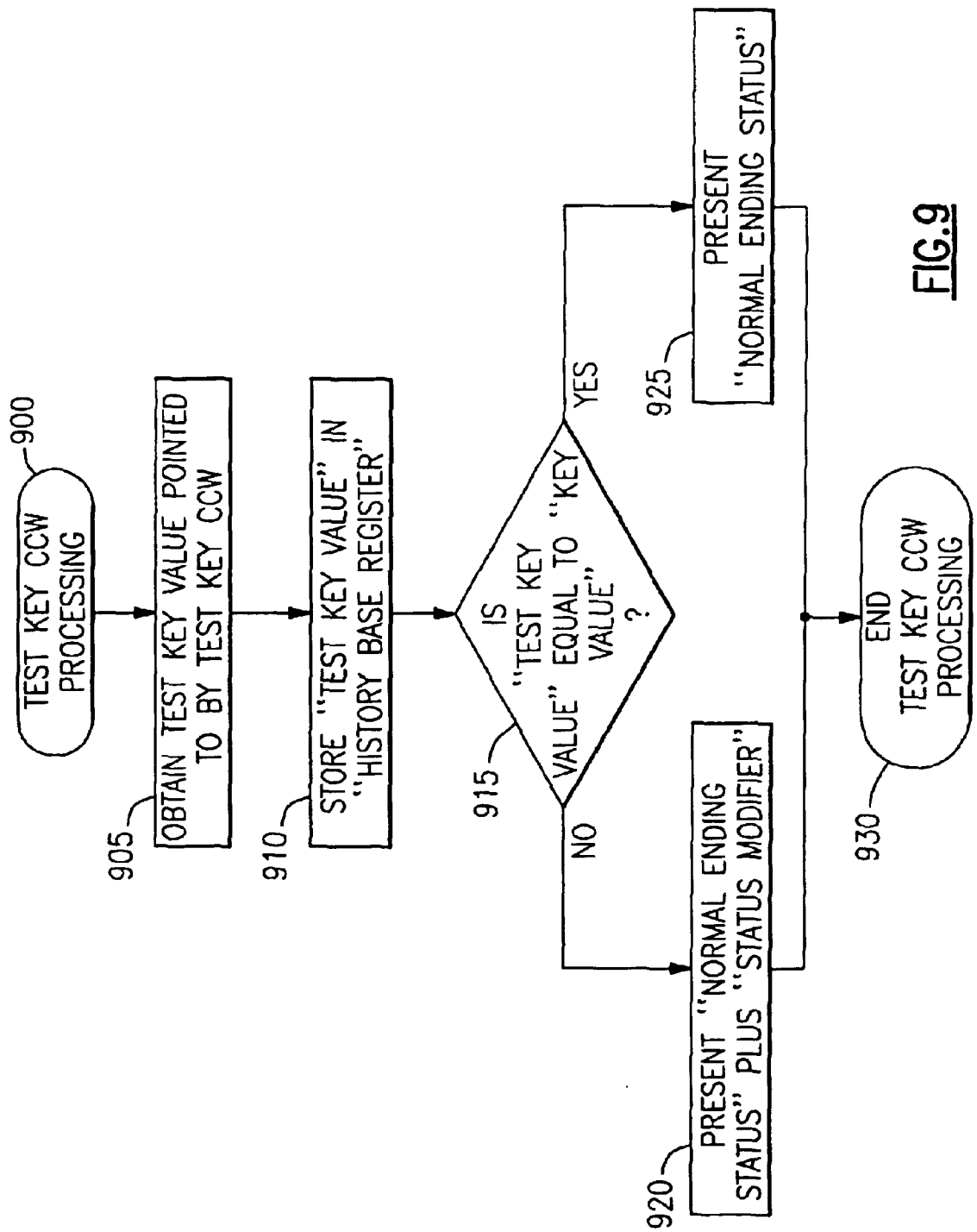
FIG. 9 illustrates logic used to process the Test Key CCW in accordance with preferred embodiments of the present invention.

With reference now to FIG. 9, the processing performed by switch 135 in response to a Test Key command will now be described. FIG. 9 illustrates the processing performed by the switch, beginning at step 900, when it receives the Test Key Channel Command. The switch first obtains the Test Key Value 240, at step 905, pointed to by the Address of Test Key Value 220. The Test Key Value 240 is then stored, step 910, in the History Base Register 330 for use by switch 135 in subsequent processing. In step 915, the Test Key Value 240, which is stored in History Base Register 330, is compared to the Key Counter 300, which is the current value stored in and in use by the switch. If the values of Key Counter 300 and Test Key Value 240 are equal, the requesting device (such as processor 100) has the current port configuration information, and no updates are necessary. In this case, processing continues at step 925, where the Test Key instruction presents normal ending status without presenting Status Modifier (indicating to the requesting device that updates are unnecessary), and processing then terminates for the Test Key instruction, step 930. If the values of Key Counter 300 and Test Key Value 240 are not equal, the requesting device does not have the current port configuration information, and an update is indicated. In this case, processing continues at step 920, where the Test Key instruction presents normal ending status, plus "Status Modifier" indicating to the requesting device that the Key Counter values did not match, and therefore that its port configuration information is in need of an update. Processing then terminates for the Test Key instruction, step 930.

Figure 10:
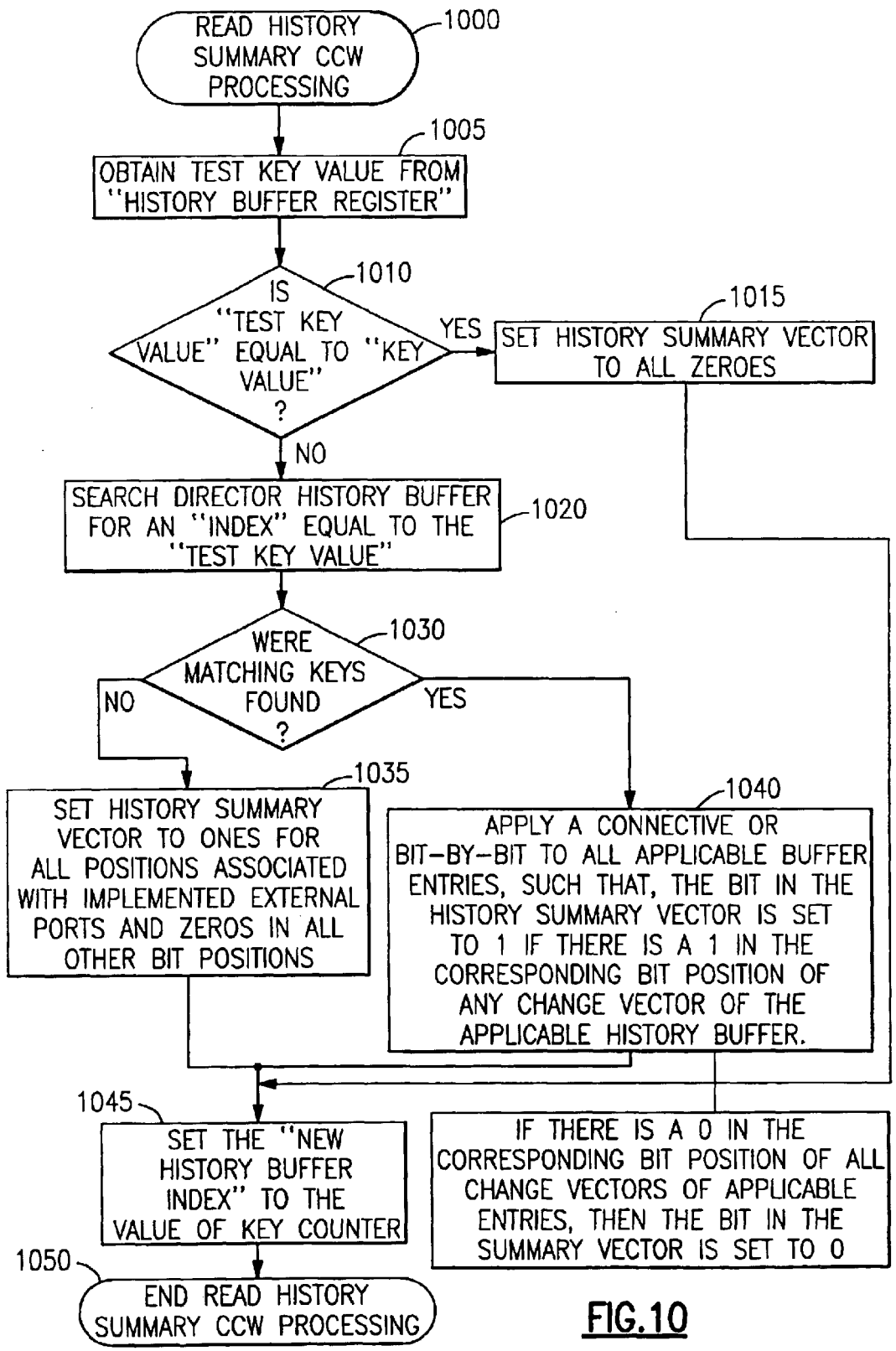
FIG. 10 illustrates logic used to process the Read History Summary CCW in accordance with preferred embodiments of the present invention.

FIG. 10 illustrates the processing of the new Read History Summary channel command performed by switch 135, beginning at step 1000, when the switch receives the Read History Summary Channel Command from a requesting device such as processor 100. At step 1005, the switch obtains the test key value from the History Base Register 330. The Key Counter value obtained from the History Base Register 330, in step 1005, is then compared to the current Key Counter 300, in step 1010. If these values are equal, processing continues at step 1015. If these values are not equal, processing continues at step 1020. For equal keys, the switch sets the History Summary Vector 290 to all zeroes, step 1015, indicating to the requesting device that no updates are necessary, and switch processing then proceeds to step 1045. For unequal keys, at step 1020 the switch searches the Director History Buffer 315 for an Index 320 which is equal to the key value obtained from the History Base Register 330 during step 1005. In step 1030, processing continues by determining if an Index 320 matching the key obtained from the History Base Register 330 (step 1005), was found within Director History Buffer 315. If no matching Index 320 is found within Director History Buffer 315, it is most likely because the History Buffer Record 317 that once contained the matching Index has been reused, and has therefore been overwritten with a more recent Key Counter 300. This situation occurs when the number of change events occurring between subsequent queries exceeds the Maximum Number of History Buffer Entries 305. When this condition occurs, switch 135 is therefore unable to determine which ports have changed configuration since the key counter was equal to the value stored in the History Base Register 330. In this case, processing continues by setting the individual bits within History Summary Vector 290 to ones for all positions associated with implemented external ports, step 1035. Bits in all other bit positions within History Summary Vector 290 are set to zeroes. By returning this History Summary Vector 290 to the requesting device, switch 135 indicates that the requesting device should refresh its port configuration information for all implemented ports within switch 135. Processing then continues at step 1045. If an Index 320 matching the key value obtained from the History Base Register 330 (from step 1005) is found within Director History Buffer 315, then a connective OR is applied, step 1040, bit-by-bit to all applicable History Buffer Entries 317 (i.e. History Buffer Entries 317 which have changed since the matching key was current), such that the bit in the History Summary Vector 290 is set to a 1 if there is a 1 in the corresponding bit position of any Change Vector 325 of the applicable History Buffer Entries 317. If there is a zero in the corresponding bit position of all Change Vectors 325 of the applicable History Buffer Entries 317, then the bit in the History Summary Vector 290 is set to 0. The set of applicable History Buffer Entries 317 is determined by using the results of step 1030: the set of applicable History Buffer Entries 317 includes all Entries 317 more recent than (and not including) the Entry 317 found in step 1030 (i.e. the Entry 317 having the matching Index value 320), up to and including the current Entry 317 pointed to by the Current History Buffer Entry Index 310. Processing then continues at step 1045. In step 1045, the New History Buffer Index 295 is set to the current value of the Key Counter 300 stored in and in use by switch 135. Processing for the Read History Summary channel command then terminates 1050.

Existing commands may be used with preferred embodiments of the present invention. Some existing commands may cause changes to the Key Counter value and port configuration, thereby invoking some aspect of the present invention. Two types of existing commands are discussed below: a command which may increment the Key Counter, and various commands which modify the configuration of one or more ports.

Figure 13:
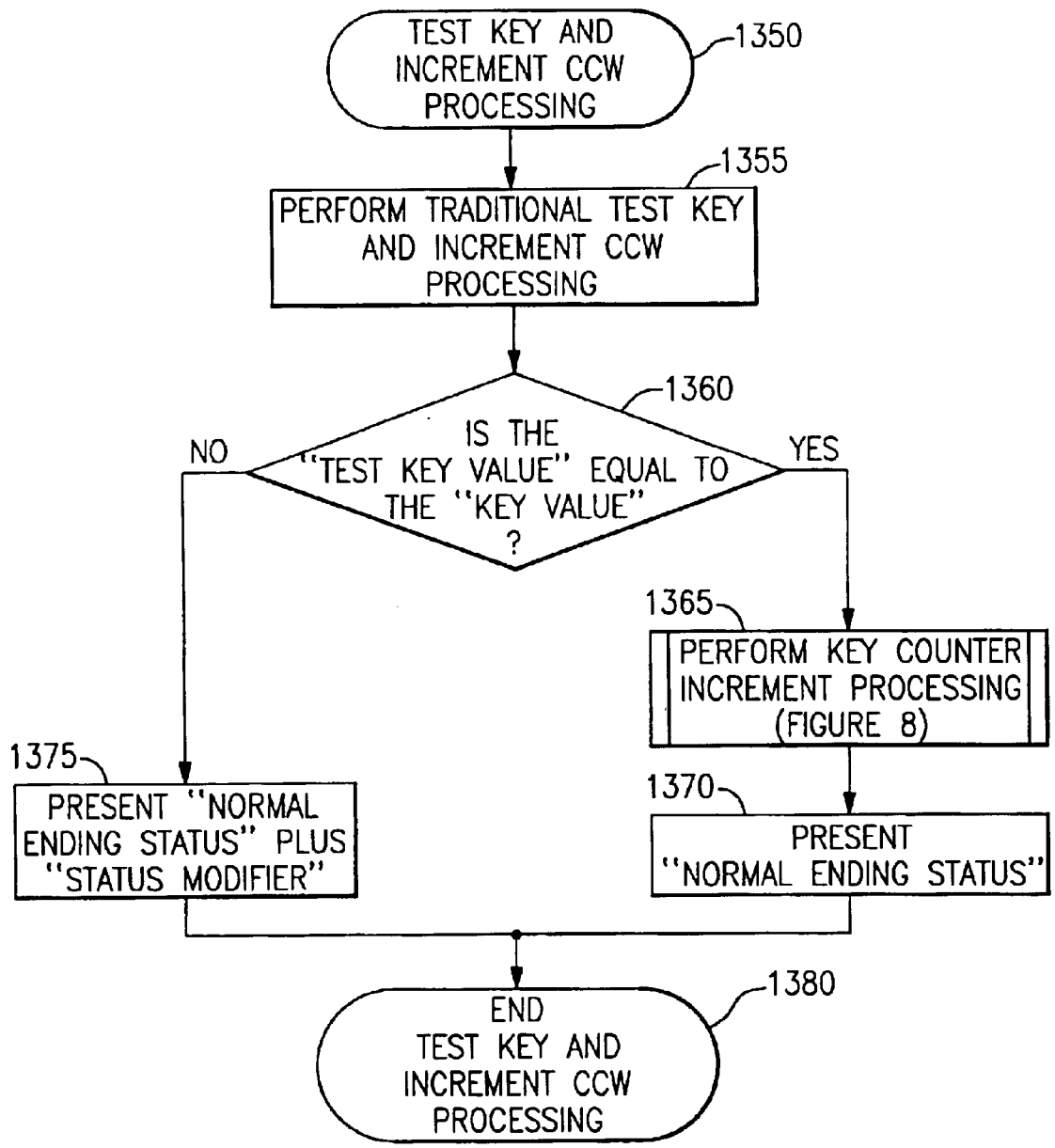
FIG. 13 illustrates the Test Key and Increment CCW processing, according to preferred embodiments of the present invention.

FIG. 13 illustrates the processing of the Test Key and Increment channel command that switch 135 performs, beginning at step 1350, when the switch receives the Test Key and Increment command from a requesting device such as processor 100. The Test Key and Increment command is documented in an IBM publication titled "Programming the Interface for Enterprise Systems Connection Directors with FICON Converter Feature," SA23-0356-06, September 1999, which is hereby incorporated herein by reference in its entirety. Next, traditional processing occurs 1355. In similar fashion to the Test Key command previously described, the Test Key and Increment command passes a key value from processor 100 to switch 135, step 1355. In step 1360, if the values of Key Counter 300 and the test key value are equal, the requesting device has the current port configuration information (indicating that processor 100 need not update its port configuration information for switch 135), and processing continues at step 1365. As previously described in detail with reference to FIG. 8, at step 1365 the value of the key counter 300 is incremented and a new history buffer entry is created. Processing continues at step 1370 where the Test Key and Increment instruction presents normal ending status without presenting Status Modifier, thereby indicating to the requesting device that the key has been incremented and that commands that are serialized can be processed for the remainder of the channel program. Such a serialized command might include, for example, one or more of the commands described below which modify the configuration of one or more ports. Processing then terminates for the Test Key and Increment instruction, step 1380. If, however, at step 1360 the values of Key Counter 300 and test key value are not equal, the requesting device does not have the current port configuration information. In this case, processing continues at step 1375, where the Test Key and Increment instruction presents normal ending status plus "Status Modifier," indicating to the requesting device that the Key Counter values did not match, and therefore the key has not been incremented and commands that are serialized cannot be processed for the remainder of the channel program. This prevents processor 100 from making any changes to the configuration of any ports within switch 135 based on inaccurate port configuration information. Processing then terminates for the Test Key and Increment instruction, step 1380.

Figure 14:
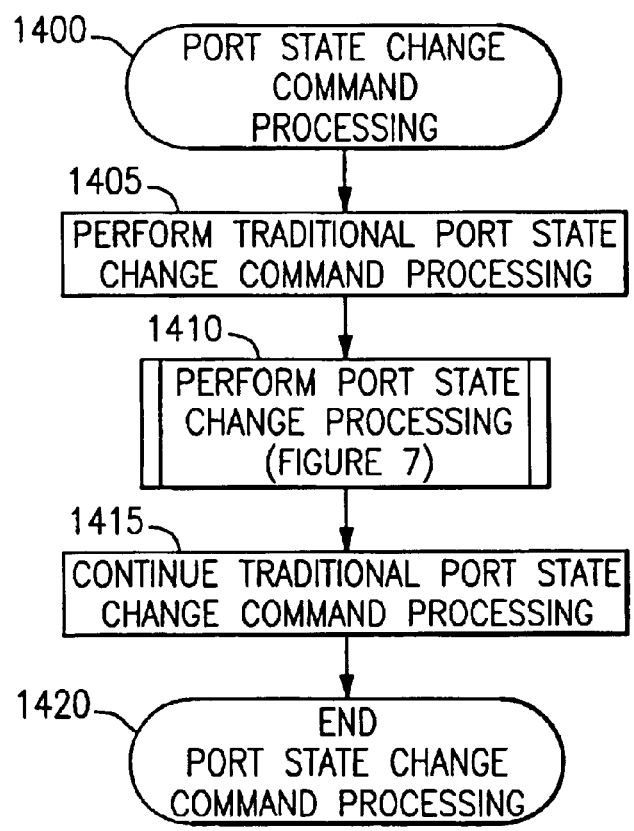
FIG. 14 illustrates the Port State Change processing, according to preferred embodiments of the present invention.

FIG. 14 illustrates the generic processing of one or more commands which modify the configuration of one or more ports within switch 135, beginning at step 1400. In preferred embodiments of the present invention, such a command is issued by an attached requesting device such as processor 100, and subsequently processed by switch 135. Such commands might include, for example "Modify Blocked State," "Modify Dedicated Connection," or "Modify PDCM." These commands are documented in an IBM publication titled "Programming the Interface for Enterprise Systems Connection Directors with FICON Converter Feature," SA23-0356-06, September 1999, which is hereby incorporated herein by reference in its entirety. Such commands are advantageously preceded by a command such as the Test Key and Increment command previously described, in order to insure that processor 100 initiates port configuration changes only when such changes are based upon current and accurate information (i.e. matching Key Counter values), and that the Key Counter increment process of FIG. 8 is performed. Next, traditional processing occurs 1405, which includes whatever is normally performed by switch 135 in response to the particular command being processed. Processing continues at step 1410 where port state change processing is performed, as previously described in detail with reference to FIG. 7. The processing of step 1410 (i.e. FIG. 7) sets a bit in the current change vector, corresponding to each port modified by the command being processed. For example, for "Modify PDCM" processing would include modifying the Prohibit Dynamic Connectivity Mask (step 1405) and modifying the bit in the change vector corresponding to the port (or ports) who's state has changed (step 1410). Next, processing continues at step 715 where any remaining traditional processing is performed. Processing then terminates at step 720.

Alternative Embodiments

Figures 1, 1C, 2:
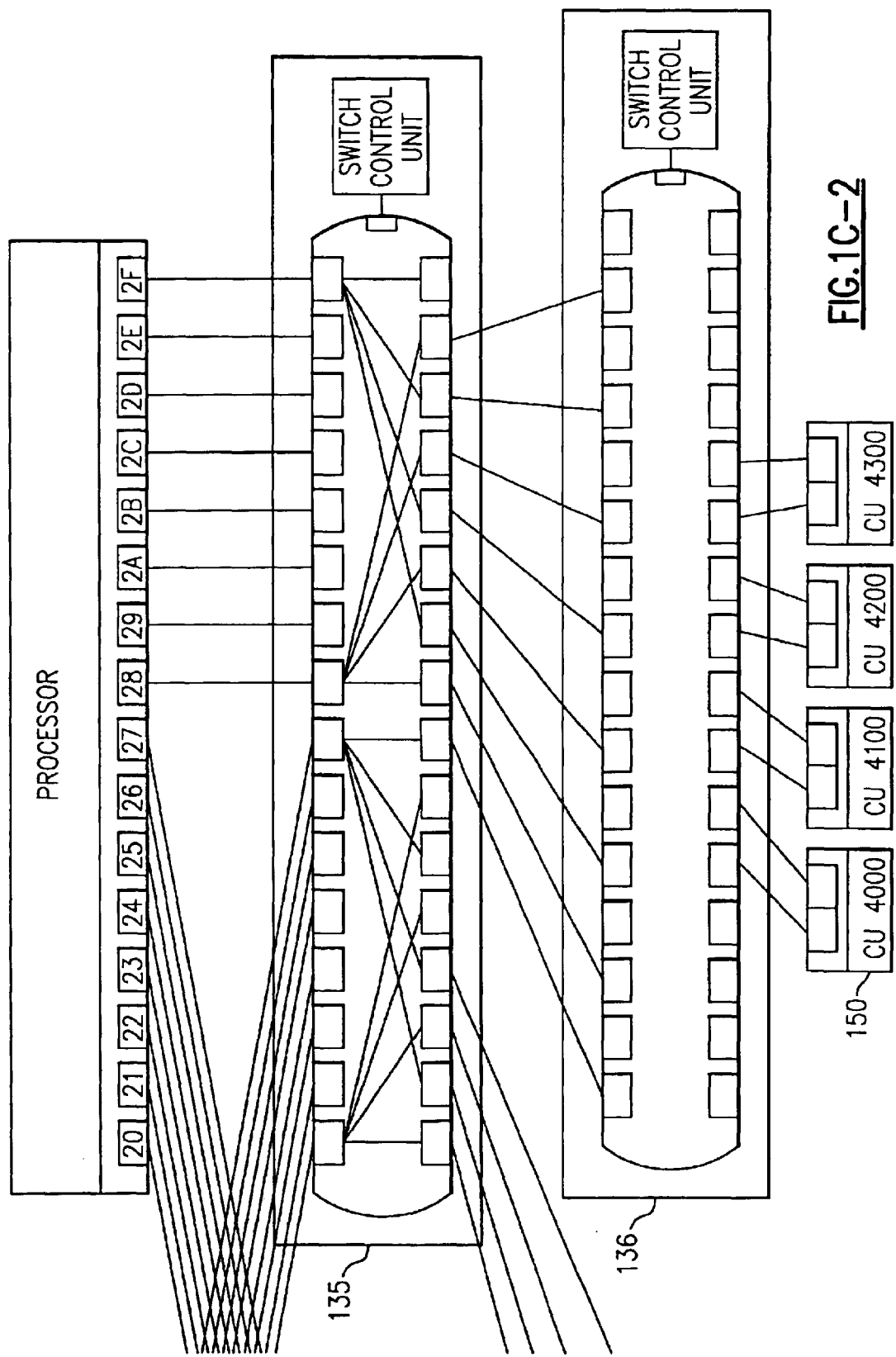
FIG. 1C illustrates various aspects of alternative embodiments of the present invention.

FIG. 1C illustrates additional features that may be present in one or more alternative embodiments of the present invention. In general, each switch 135 may be connected to one or more processors 100. Further, each processor 100 may be connected to one or more switches 135. Each of these possibilities is contemplated within the spirit and scope of the present invention.

As further illustrated in FIG. 1C, alternative embodiments are contemplated wherein multiple switches 135 are chained or cascaded. In particular, processor 100 may be attached to switch 135, and switch 135 may be attached to a second switch 136. Communication between processor 100 and CU's 150 is accomplished through both switches 135 and 136: in the configuration illustrated in FIG. 1C, processor 100 does not have access to a direct communication path to switch 136. Under these or similar circumstances, the requesting device may be another switch, rather than a processor. For example, the requesting device for switch 136 in FIG. 1C may be switch 135. Switch 135 may have knowledge of the configuration of switch 136, enabling switch 135 to process routing requests efficiently, to provide the configuration information of switch 136 to another requesting device, such as processor 100, in the case that the other requesting device does not have access to all switches in the topology, or is unable to access switch 136 directly. In such a case, the requesting switch would issue commands to the other switch, presenting itself to the other switch as if it were a host. The data structures, processes, and communication protocols described herein also apply to such circumstances, where the requesting device is a switch.

In alternative embodiments, the requesting device may be a process which manages or monitors a switched storage environment (or topology), for example a SAN manager. In such an embodiment the process could reside on a host processor, a switch within the environment, or as a separate processor used for managing and/or monitoring the storage topology or environment.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method of informing a requesting device of configuration changes in a switched I/O network in communication with said requesting device, said method comprising the steps of:

initializing a switch in communication with said requesting device, said switch including a plurality of communication ports, said initializing including the steps of setting an initial change index value, creating an initial data vector identifying implemented ports, and storing said change index value in association with said initial data vector;

incrementing said change index in response to a subsequent configuration change;

creating a data vector in response to said subsequent configuration change, said data vector identifying each of said plurality of ports affected by said subsequent configuration change;

storing said data vector in association with said incremented change index;

responding to a query from said requesting device, by identifying to said requesting device all ports previously identified as affected by a configuration change in one or more data vectors associated with change index values more recent than the most recent change index value known to said requesting device.

2. The method of claim 1, wherein said initializing further includes the steps of:

determining the current configuration of said plurality of ports, storing port configuration information describing said current configuration.

3. The method of claim 2, further comprising the steps of:

communicating at least a portion of said stored port configuration information to said requesting device;

storing said communicated port configuration information in said requesting device.

4. The method of claim 2, further comprising the steps of:

updating said stored configuration information to reflect said subsequent configuration change;

storing said updated configuration information.

5. The method of claim 4, further comprising the steps of:

communicating at least a portion of said updated port configuration information to said requesting device;

storing said communicated port configuration information in said requesting device.

6. The method of claim 1, wherein a limited number of the most recent pairs of associated change indices and data vectors are stored.

7. The method of claim 6, wherein when the most recent change index known to the requesting device is no longer stored by said switch, the requesting device is informed that all of said implemented ports have been affected by a configuration change.

8. The method of claim 1, further comprising the step of passing from said requesting device to said switch, substantially concurrently with said query, the most recent change index value known to said requesting device.

9. The method of claim 8, further comprising the steps of:

storing in said switch said most recent change index value known to said requesting device, and using said stored change index value to identify the first change index value for which port configuration changes are identified.

10. A method of informing a requesting device of configuration changes in a switched I/O network in communication with said requesting device, said method comprising the steps of:

initializing a switch in processing communication with said requesting device, said switch comprising a plurality of communication ports, said initializing including the steps of determining the current port configuration, storing port configuration information describing said current port configuration, setting an initial change index value, creating an initial data vector identifying implemented ports, and storing said change index value in association with said initial data vector; changing said port configuration;

updating said stored port configuration information to describe said changed port configuration;

storing said updated port configuration information;

incrementing said change index in response to said configuration change;

creating a data vector identifying each of said plurality of ports affected by said configuration change;

storing said data vector in association with said incremented change index;

responding to a query from said requesting device, by identifying to said requesting device all ports previously identified as affected by a configuration change in one or more data vectors associated with change index values more recent than the most recent change index value known to said requesting device.

11. The method of claim 10, further comprising the steps of:

communicating at least a portion of said stored port configuration information to said requesting device;

storing said communicated port configuration information in said requesting device.

12. The method of claim 11, further comprising the steps of:

communicating at least a portion of said updated port configuration information to said requesting device;

storing said communicated port configuration information in said requesting device.

13. The method of claim 10, wherein a limited number of the most recent pairs of associated change indices and data vectors are stored.

14. The method of claim 13, wherein when the most recent change index known to the requesting device is no longer stored, the requesting device is informed that all of said implemented ports have been affected by a configuration change.

15. The method of claim 10, further comprising the step of:

passing, from said requesting device to said switch substantially concurrently with said query, the most recent change index value known to said requesting device.

16. The method of claim 15, further comprising the steps of:

storing in said switch said most recent change index value known to said requesting device, and using said stored change index value to identify the first change index value for which port configuration changes are identified.

17. An input/output (I/O) network switching device, said device comprising:

a plurality of communication ports, each of said ports capable of being in communication with an external data processing device;

a switch processor in communication with said plurality of communication ports, said switch processor further capable of being in communication with a requesting device;

a port configuration history data structure accessible to said switch processor, said history data structure comprising associated pairs of change index values and change data vectors, each of said associated pairs relating to a port configuration change event, each of said change index values providing for said history data structure an index corresponding to said related port configuration change event, each of said change data vectors identifying specific ones of said plurality of ports affected by said related port configuration change event;

an incrementing unit, said incrementing unit increasing by one the current value of said change index value in response to a port configuration change event;

port configuration data accessible to said switch processor, said port configuration data being used by said switch processor to create one of said change data vectors in response to and in association with a port configuration change event, said switch processor storing said incremented change index value and said one of said change data vectors as one of said associated pairs within said port configuration history data structure;

a configuration history summary unit, wherein in response to a query from said requesting device said configuration history summary unit produces a summary vector identifying all ports previously identified as affected by a configuration change in one or more change data vectors associated with change index values more recent than the most recent change index value known to said requesting device, said summary vector capable of being communicated to said requesting device in response to said query.

18. The device of claim 17, wherein said requesting device is a host processor.

19. The device of claim 17, wherein said requesting device is a second input/output network switching device.

20. The device of claim 17, wherein said input/output switching device is an ESCON director.

21. The device of claim 17, wherein said I/O switching device is a FICON director.

22. The device of claim 17, wherein said requesting device is a process which manages a switched storage environment.

23. The device of claim 22, wherein said requesting device is a SAN manager.

24. The device of claim 17, wherein said external data processing device is selected from the group consisting of a host processor, an I/O device controller, and another I/O network switching device.

25. At least one program storage device readable by a machine tangibly embodying at least one program of instructions executable by machine to perform a method for informing a requesting device of configuration changes in a switched I/O network in communication with said requesting device, said method comprising:

initializing a switch in communication with said requesting device, said switch including a plurality of communication ports, said initializing including the steps of setting an initial change index value, and storing said change index value in association with an initial configuration of said plurality of ports;

incrementing said change index in response to a subsequent configuration change;

creating a data vector in response to said subsequent configuration change, said data vector identifying each of said plurality of ports affected by said subsequent configuration change;

storing said data vector in association with said incremented change index;

responding to a query from said requesting device, by identifying to said requesting device all ports previously identified as affected by a configuration change in one or more data vectors associated with change index values more recent than the most recent change index value known to said requesting device.

26. The at least one program storage device of claim 25, wherein said initializing further includes the steps of:

determining the current configuration of said plurality of ports, storing port configuration information describing said current configuration.

27. The at least one program storage device of claim 26, further comprising the steps of:

communicating at least a portion of said stored port configuration information to said requesting device;

storing said communicated port configuration information in said requesting device.

28. The at least one program storage device of claim 26, further comprising the steps of:

updating said stored configuration information to reflect said subsequent configuration change;

storing said updated configuration information.

29. The at least one program storage device of claim 28, further comprising the steps of:

communicating at least a portion of said updated port configuration information to said requesting device;

storing said communicated port configuration information in said requesting device.

30. The at least one program storage device of claim 25, wherein a limited number of the most recent pairs of associated change indices and data vectors are stored.

31. The at least one program storage device of claim 30, wherein when the most recent change index known to the requesting device is no longer stored, the requesting device is informed that all of said plurality of ports have been affected by a configuration change.

32. The at least one program storage device of claim 25, further comprising the step of passing from said requesting device to said switch, substantially concurrently with said query, the most recent change index value known to said requesting device.

33. The at least one program storage device of claim 32, further comprising the steps of:

storing in said switch said most recent change index value known to said requesting device, and using said stored change index value to identify the first change index value for which port configuration changes are identified.

34. The at least one program storage device of claim 25, further comprising the step of informing said requesting device that said switch support the history buffer feature, prior to said responding.

* * * * *